(12) United States Patent
Zheng

(10) Patent No.: US 10,834,398 B2
(45) Date of Patent: *Nov. 10, 2020

(54) METHOD FOR DIVIDING PREDICTION BLOCK, ENCODING DEVICE, AND DECODING DEVICE

(71) Applicant: Huawei Technologies Co., Ltd., Shenzhen (CN)

(72) Inventor: Xiaozhen Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

This patent is subject to a terminal disclaimer.

(21) Appl. No.: 16/263,779

(22) Filed: Jan. 31, 2019

(65) Prior Publication Data

US 2019/0166366 A1    May 30, 2019

Related U.S. Application Data

(63) Continuation of application No. 15/362,452, filed on Nov. 28, 2016, now Pat. No. 10,230,953, which is a
(Continued)

(30) Foreign Application Priority Data

Oct. 11, 2014    (CN) .......................... 2014 1 0535982

(51) Int. Cl.
*H04N 19/119* (2014.01)
*H04N 19/162* (2014.01)
(Continued)

(52) U.S. Cl.
CPC ......... *H04N 19/119* (2014.11); *H04N 19/139* (2014.11); *H04N 19/162* (2014.11); *H04N 19/176* (2014.11)

(58) Field of Classification Search
None
See application file for complete search history.

(56) References Cited

U.S. PATENT DOCUMENTS

2012/0147961 A1    6/2012   Guo et al.
2013/0003824 A1    1/2013   Guo et al.
(Continued)

FOREIGN PATENT DOCUMENTS

CN    102215395 A    10/2011
CN    102388614 A    3/2012
(Continued)

OTHER PUBLICATIONS

Machine Translation and Abstract of Chinese Publication No. CN104284188, Sep. 24, 2016, 6 pages.
(Continued)

*Primary Examiner* — Dave Czekaj
*Assistant Examiner* — Samuel D Fereja
(74) *Attorney, Agent, or Firm* — Conley Rose, P.C.

(57) ABSTRACT

A method for dividing a prediction block, an encoding device, and a decoding device, where the method includes acquiring a manner of division into the prediction block, where the manner of division into the prediction block is a horizontal division manner, a vertical division manner, or a square division manner, determining a horizontal division size and a vertical division size according to the manner of division into the prediction block, and dividing the prediction block into at least one prediction subblock according to the horizontal division size and the vertical division size.

17 Claims, 8 Drawing Sheets

Related U.S. Application Data continuation of application No. PCT/CN2015/090438, filed on Sep. 23, 2015.

(51) Int. Cl.
*H04N 19/139* (2014.01)
*H04N 19/176* (2014.01)

(56) References Cited

U.S. PATENT DOCUMENTS

| | | |
|---|---|---|
| 2013/0163664 A1 | 6/2013 | Guo et al. |
| 2014/0010469 A1 | 1/2014 | Yuan et al. |
| 2014/0079332 A1 | 3/2014 | Zheng |
| 2019/0166366 A1* | 5/2019 | Zheng ............... H04N 19/119 |

FOREIGN PATENT DOCUMENTS

| | | |
|---|---|---|
| CN | 102685487 A | 9/2012 |
| CN | 103636215 A | 3/2014 |
| CN | 104284188 A | 1/2015 |
| TW | 201143446 A | 12/2011 |

OTHER PUBLICATIONS

Machine Translation and Abstract of Chinese Publication No. CN103636215, Mar. 12, 2014, 34 pages.

Jager, F., et al. "Low Complex Partitioning Derivation for DBBP," XP30132107, JCT3V-H0058, Mar. 29-Apr. 4, 2014, 6 pages.

Huang, H., et al. "3D-CE1 related: Simplification on merging candidate list in depth coding," JCT3V-H0074, Mar. 29-Apr. 4, 2014, 3 pages.

Liu, H., et al. "Simplification of Sub-PU based MPI," JCT3V-H0133, Mar. 29-Apr. 4, 2014, 4 pages.

Yeo, C. "CE11: Cross-check of CE.B1—Scans for large blocks in CAVLC," JCTVC-G077, WG11 No. m21624, Nov. 21-30, 2011, 2 pages.

Fuldseth, A., et al., "CE8.a.2" ALF with LCU-based syntax, JCTVC-H0066, Feb. 1-10, 2012, 11 pages.

Foreign Communication From A Counterpart Application, Chinese Application No. 201410535982.4, Chinese Office Action dated Dec. 23, 2016, 4 pages.

Foreign Communication From A Counterpart Application, Chinese Application No. 201410535982.4, Chinese Search Report dated Dec. 15, 2016, 2 pages.

Foreign Communication From A Counterpart Application, European Application No. 15849357.7, Extended Europen Search Report dated Mar. 29, 2017, 10 pages.

Foreign Communication From A Counterpart Application, PCT Application No. PCT/CN2015/090438, English Translation of International Search Report dated Jan. 11, 2016, 3 pages.

Foreign Communication From A Counterpart Application, PCT Application No. PCT/CN2015/090438, English Translation of Written Opinion dated Jan. 11, 2016, 3 pages.

Foreign Communication From A Counterpart Application, Chinese Application No. 201410535982.4, Chinese Search Report dated Aug. 1, 2017, 2 pages.

Foreign Communication From A Counterpart Application, Chinese Application No. 201410535982.4, Chinese Office Action dated Aug. 9, 2017, 3 pages.

* cited by examiner

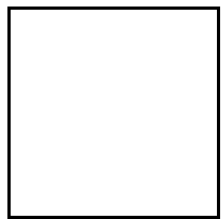
FIG. 1A

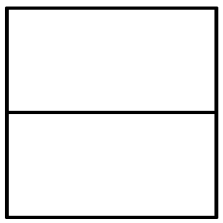
FIG. 1B

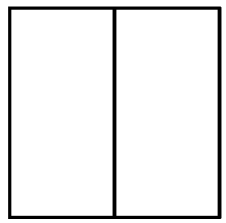
FIG. 1C

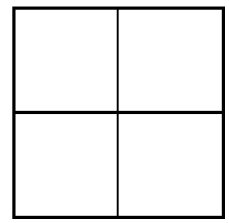
FIG. 1D

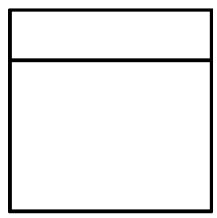
FIG. 2A

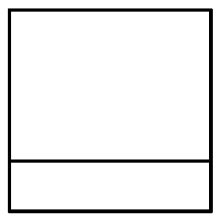
FIG. 2B

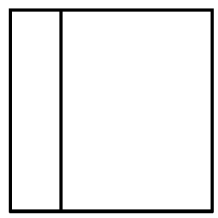
FIG. 2C

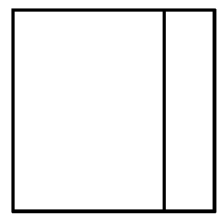
FIG. 2D

100

Acquire a manner of division into a prediction block, where the division manner of the prediction block is a horizontal division manner, a vertical division manner, or a square division manner ~ S110

Determine a horizontal division size and a vertical division size according to the manner of division into the prediction block ~ S120

Divide the prediction block into at least one prediction subblock according to the horizontal division size and the vertical division size ~ S130

FIG. 3

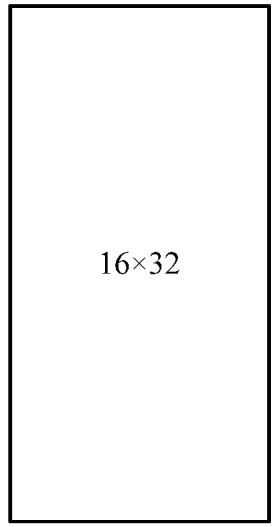
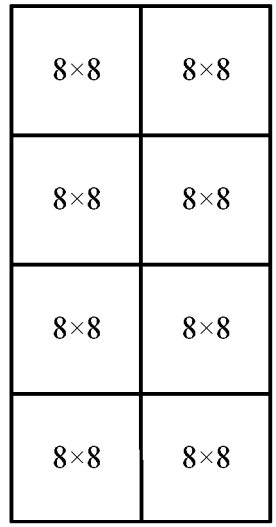
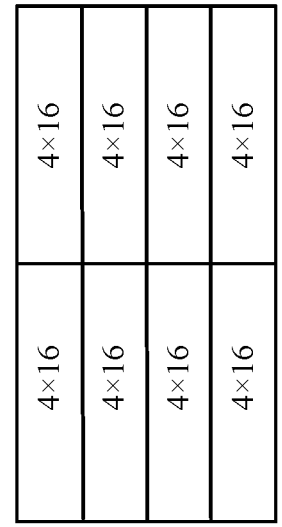
FIG. 7A  FIG. 7B  FIG. 7C
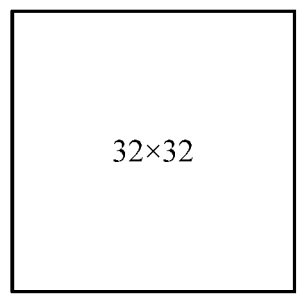
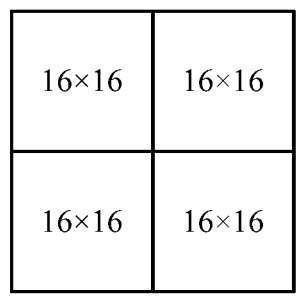
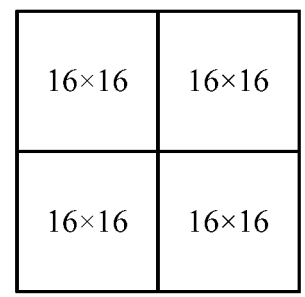
FIG. 8A  FIG. 8B  FIG. 8C

METHOD FOR DIVIDING PREDICTION BLOCK, ENCODING DEVICE, AND DECODING DEVICE

CROSS-REFERENCE TO RELATED APPLICATIONS

This application is a continuation of U.S. patent application Ser. No. 15/362,452 filed on Nov. 28, 2016, which is a continuation of International Patent Application No. PCT/CN2015/090438 filed on Sep. 23, 2015, which claims priority to Chinese Patent Application No. 201410535982.4 filed on Oct. 11, 2014. All of the afore-mentioned patent applications are hereby incorporated by reference in their entireties.

TECHNICAL FIELD

The present application relates to the image processing field, and in particular, to a method for dividing a prediction block, an encoding device, and a decoding device in the image processing field.

BACKGROUND

To reduce bandwidth occupied during video transmission, an encoding device needs to perform encoding processing on a video image, and correspondingly, a decoding device needs to perform decoding processing on video data received by the decoding device. An interframe compression method is a common video coding technology, which can perform compression processing on a to-be-transmitted video image, and can reduce an amount of data during video transmission.

The interframe compression method is a motion-estimation-based video coding technology. A process in which the encoding device encodes a video image includes first, dividing a to-be-coded video image into several equal-sized image blocks referred to as code blocks, then, dividing a code block to obtain image subblocks referred to as prediction blocks, and searching a reference image for an image block that best matches a current prediction block and using the image block as a reference block, then, performing a subtraction operation between corresponding pixel values of the current prediction block and the reference block to obtain a residual, and combining obtained residuals corresponding to all prediction blocks to obtain a residual of the to-be-coded video image, then, performing entropy coding on a value obtained by transforming and quantizing the residual of the to-be-coded video image, and finally, sending motion information and a bit stream that are obtained by means of entropy coding together to the decoding device. The motion information represents a difference between locations of the current prediction block and the reference block. After receiving the bit stream and the motion information that are sent by the encoding device, the decoding device performs a processing process inverse to that of the encoding device to obtain data corresponding to the original video image.

In the prior art, a prediction subblock technology is introduced so to obtain a more accurate reference motion vector. A basic idea of the prediction subblock technology is dividing a current prediction block into smaller prediction subblocks. For example, the current prediction block may be divided into multiple prediction subblocks of a smaller size (for example, the size is 8×8), and reference motion vectors are obtained from a reference image in units of prediction subblocks obtained by means of division. A current prediction block may be divided into multiple prediction subblocks using the prediction subblock technology in order to obtain more reference motion vectors, which can improve encoding quality.

However, the following two problems exist in the existing prediction subblock technology First, because a size of a prediction subblock is preset, for example, the size of a prediction subblock is preset to 8×8, when a size of a side of a prediction block is less than the preset size of a prediction subblock, the side is not divided. For example, when a size of a prediction block is 16×4, a size of a vertical side of the prediction block is 4 and is less than 8. Therefore, the vertical side is not divided, and in this case, the 16×4 prediction block is divided to obtain two prediction subblocks whose size is 8×4. When a size of a side of a prediction block is not a multiple of 8, the side is not divided. For example, when a size of a prediction block is 16×12, a size of a vertical side of the prediction block is 12 and is not a multiple of 8. Therefore, the vertical side is not divided, and in this case, the 16×12 prediction block is divided to obtain two prediction subblocks whose size is 8×12. For another example, when a size of a prediction block is 12×12, and a size of a prediction subblock is preset to 8×8, because neither a size of a horizontal side of the prediction block nor a size of a vertical side is a multiple of 8, a size of a prediction subblock obtained by means of division is still 12×12. A problem of such a division method is introducing some prediction subblocks whose sizes are not a size used in an existing encoding/decoding device, for example, a prediction subblock whose size is 8×12. However, before the prediction subblock technology is introduced, the blocks whose sizes are not the size used in the existing encoding/decoding device do not exist. Therefore, because some prediction subblock sizes are added due to the prediction subblock technology, implementation load on an encoding/decoding system is increased. Second, in the existing prediction subblock technology, prediction subblocks are all square, which cannot reflect texture of the prediction block, and this affects accuracy of an acquired reference motion vector.

SUMMARY

Embodiments of the present application provide a method for dividing a prediction block, an encoding device, and a decoding device, which can avoid occurrence of a prediction subblock whose size is not a size used in an existing encoding/decoding device, and improve accuracy of a reference motion vector acquired using the prediction subblock.

According to a first aspect, a method for dividing a prediction block is provided, where the method includes acquiring a manner of division into the prediction block, where the manner of division into the prediction block is a horizontal division manner, a vertical division manner, or a square division manner, determining a horizontal division size and a vertical division size according to the manner of division into the prediction block, and dividing the prediction block into at least one prediction subblock according to the horizontal division size and the vertical division size.

With reference to the first aspect, in a first possible implementation manner of the first aspect, a size of a horizontal side of the prediction subblock is equal to the horizontal division size, and a size of a vertical side of the prediction subblock is equal to the vertical division size.

With reference to the first aspect or the first possible implementation manner of the first aspect, in a second possible implementation manner of the first aspect, the determining a horizontal division size and a vertical division size according to the manner of division into the prediction block includes acquiring a base size M, where M is a positive integer, and determining the horizontal division size and the vertical division size according to the manner of division into the prediction block and based on the base size M.

With reference to any one of the first aspect, the first implementation manner of the first aspect or the second possible implementation manner of the first aspect, in a third possible implementation manner of the first aspect, the determining a horizontal division size and a vertical division size according to the manner of division into the prediction block includes determining the horizontal division size and the vertical division size when the manner of division into the prediction block is a horizontal division manner, where the horizontal division size is greater than the vertical division size.

With reference to the second possible implementation manner of the first aspect, in a fourth possible implementation manner of the first aspect, the determining the horizontal division size and the vertical division size according to the manner of division into the prediction block and based on the base size M includes when the manner of division into the prediction block is a horizontal division manner, based on the base size M, determining the horizontal division size as J and determining the vertical division size as K, where J and K are positive integers, J is greater than M, and K is less than M.

With reference to the fourth possible implementation manner of the first aspect, in a fifth possible implementation manner of the first aspect, a value of J is a corresponding value obtained by shifting M leftward by p places, and a value of K is a corresponding value obtained by shifting M rightward by p places, where p is a positive integer.

With reference to the fifth possible implementation manner of the first aspect, in a sixth possible implementation manner of the first aspect, p=1.

With reference to any one of the first aspect, the first implementation manner of the first aspect or the second possible implementation manner of the first aspect, in a seventh possible implementation manner of the first aspect, the determining a horizontal division size and a vertical division size according to the manner of division into the prediction block includes determining the horizontal division size and the vertical division size when the manner of division into the prediction block is a vertical division manner, where the horizontal division size is less than the vertical division size.

With reference to the second possible implementation manner of the first aspect, in an eighth possible implementation manner of the first aspect, the determining the horizontal division size and the vertical division size according to the manner of division into the prediction block and based on the base size M includes when the manner of division into the prediction block is a vertical division manner, based on the base size M, determining the horizontal division size as Y and determining the vertical division size as Z, where Y and Z are positive integers, Y is less than M, and Z is greater than M.

With reference to the eighth possible implementation manner of the first aspect, in a ninth possible implementation manner of the first aspect, a value of Y is a corresponding value obtained by shifting M rightward by q places, and a value of Z is a corresponding value obtained by shifting M leftward by q places, where q is a positive integer.

With reference to the ninth possible implementation manner of the first aspect, in a tenth possible implementation manner of the first aspect, q=1.

With reference to any one of the first aspect, the first implementation manner of the first aspect or the second possible implementation manner of the first aspect, in an eleventh possible implementation manner of the first aspect, the determining a horizontal division size and a vertical division size according to the manner of division into the prediction block includes determining the horizontal division size and the vertical division size when the manner of division into the prediction block is a square division manner, where the horizontal division size is equal to the vertical division size.

With reference to the second possible implementation manner of the first aspect, in a twelfth possible implementation manner of the first aspect, the determining the horizontal division size and the vertical division size according to the manner of division into the prediction block and based on the base size M includes when the manner of division into the prediction block is a square division manner, based on the base size M, determining the horizontal division size as M and determining the vertical division size as M.

With reference to the first aspect, in a thirteenth possible implementation manner of the first aspect, the dividing the prediction block into at least one prediction subblock according to the horizontal division size and the vertical division size includes when the horizontal division size is greater than a size of a horizontal side of the prediction block, dividing the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, dividing the prediction block into the prediction subblock according to the horizontal division size, where a size of a horizontal side of the prediction subblock is equal to the horizontal division size, or when the vertical division size is greater than a size of a vertical side of the prediction block, dividing the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, dividing the prediction block into the prediction subblock according to the vertical division size, where a size of a vertical side of the prediction subblock is equal to the vertical division size.

With reference to any one of the first aspect or the first to the thirteenth possible implementation manners of the first aspect, in a fourteenth possible implementation manner of the first aspect, according to the horizontal division size and the vertical division size, sizes of horizontal sides of all obtained prediction subblocks are the same, and sizes of vertical sides of all obtained prediction subblocks are the same.

With reference to any one of the first aspect or the first to the fourteenth possible implementation manners of the first aspect, in a fifteenth possible implementation manner of the first aspect, the method further includes obtaining motion information according to the prediction subblock.

With reference to the fifteenth possible implementation manner of the first aspect, in a sixteenth possible implementation manner of the first aspect, the obtaining motion information according to the prediction subblock includes obtaining the motion information from a reference view image or a texture image according to the prediction subblock.

According to a second aspect, a method for dividing a prediction block is provided, where the method includes acquiring a size of a horizontal side and a size of a vertical side that are of the prediction block, acquiring a base size, and determining a size of a horizontal side of a prediction subblock according to a magnitude relationship between the size of the horizontal side of the prediction block and the base size or a magnitude relationship between the size of the vertical side of the prediction block and the base size, determining a size of a vertical side of the prediction subblock according to the magnitude relationship between the size of the horizontal side of the prediction block and the base size or the magnitude relationship between the size of the vertical side of the prediction block and the base size, and dividing the prediction block into at least one such prediction subblock according to the size of the horizontal side of the prediction subblock and the size of the vertical side of the prediction subblock.

With reference to the second aspect, in a first possible implementation manner of the second aspect, the determining a size of a horizontal side of a prediction subblock according to a magnitude relationship between the size of the horizontal side of the prediction block and the base size or a magnitude relationship between the size of the vertical side of the prediction block and the base size, determining a size of a vertical side of the prediction subblock according to the magnitude relationship between the size of the horizontal side of the prediction block and the base size or the magnitude relationship between the size of the vertical side of the prediction block and the base size, and dividing the prediction block into at least one such prediction subblock according to the size of the horizontal side of the prediction subblock and the size of the vertical side of the prediction subblock includes when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, dividing the prediction block into one prediction subblock according to the size of the horizontal side of the prediction block and the size of the vertical side of the prediction block.

With reference to the second aspect, in a second possible implementation manner of the second aspect, the determining a size of a horizontal side of a prediction subblock according to a magnitude relationship between the size of the horizontal side of the prediction block and the base size or a magnitude relationship between the size of the vertical side of the prediction block and the base size, and determining a size of a vertical side of the prediction subblock according to the magnitude relationship between the size of the horizontal side of the prediction block and the base size or the magnitude relationship between the size of the vertical side of the prediction block and the base size includes when a preset condition is met, setting the size of the horizontal side of the prediction subblock to the size of the horizontal side of the prediction block and setting the size of the vertical side of the prediction subblock to the size of the vertical side of the prediction block, or when the preset condition is not met, setting the size of the horizontal side of the prediction subblock to the base size and setting the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

With reference to any one of the second aspect, the first implementation manner of the second aspect, or the second possible implementation manner of the second aspect, in a third possible implementation manner of the second aspect, the method further includes obtaining motion information according to the prediction subblock.

With reference to the third possible implementation manner of the second aspect, in a fourth possible implementation manner of the second aspect, the obtaining motion information according to the prediction subblock includes obtaining the motion information from a reference view image or a texture image according to the prediction subblock.

According to a third aspect, an encoding device is provided, where the encoding device includes a first acquiring module configured to acquire a manner of division into a prediction block, where the manner of division into the prediction block is a horizontal division manner, a vertical division manner, or a square division manner, a determining module configured to determine a horizontal division size and a vertical division size according to the manner of division into the prediction block that is acquired by the first acquiring module, and a division module configured to divide the prediction block into at least one prediction subblock according to the horizontal division size and the vertical division size that are determined by the determining module.

With reference to the third aspect, in a first possible implementation manner of the third aspect, a size of a horizontal side of the prediction subblock is equal to the horizontal division size, and a size of a vertical side of the prediction subblock is equal to the vertical division size.

With reference to the third aspect or the first possible implementation manner of the third aspect, in a second possible implementation manner of the third aspect, the determining module includes an acquiring submodule configured to acquire a base size M, where M is a positive integer, and a determining submodule configured to determine the horizontal division size and the vertical division size according to the manner of division into the prediction block and based on the base size M, where the manner of division into the prediction block is acquired by the first acquiring module, and the base size M is acquired by the acquiring submodule.

With reference to any one of the third aspect, the first implementation manner of the third aspect, or the second possible implementation manner of the third aspect, in a third possible implementation manner of the third aspect, the determining module is further configured to determine the horizontal division size and the vertical division size when the manner of division into the prediction block that is acquired by the first acquiring module is a horizontal division manner, where the horizontal division size is greater than the vertical division size.

With reference to the second possible implementation manner of the third aspect, in a fourth possible implementation manner of the third aspect, the determining submodule is further configured to when the manner of division into the prediction block that is acquired by the first acquiring module is a horizontal division manner, determine the horizontal division size as J and determine the vertical division size as K, where J and K are positive integers, J is greater than M, and K is less than M.

With reference to the fourth possible implementation manner of the third aspect, in a fifth possible implementation manner of the third aspect, a value of J is a corresponding value obtained by shifting M leftward by p places, and a value of K is a corresponding value obtained by shifting M rightward by p places, where p is a positive integer.

With reference to the fifth possible implementation manner of the third aspect, in a sixth possible implementation manner of the third aspect, p=1.

With reference to any one of the third aspect, the first implementation manner of the third aspect, or the second possible implementation manner of the third aspect, in a seventh possible implementation manner of the third aspect, the determining module is further configured to determine the horizontal division size and the vertical division size when the manner of division into the prediction block that is acquired by the first acquiring module is a vertical division manner, where the horizontal division size is less than the vertical division size.

With reference to the second possible implementation manner of the third aspect, in an eighth possible implementation manner of the third aspect, the determining submodule is further configured to when the manner of division into the prediction block that is acquired by the first acquiring module is a vertical division manner, determine the horizontal division size as Y and determine the vertical division size as Z, where Y and Z are positive integers, Y is less than M, and Z is greater than M.

With reference to the eighth possible implementation manner of the third aspect, in a ninth possible implementation manner of the third aspect, a value of Y is a corresponding value obtained by shifting M rightward by q places, and a value of Z is a corresponding value obtained by shifting M leftward by q places, where q is a positive integer.

With reference to the ninth possible implementation manner of the third aspect, in a tenth possible implementation manner of the third aspect, q=1.

With reference to any one of the third aspect, the first implementation manner of the third aspect, or the second possible implementation manner of the third aspect, in an eleventh possible implementation manner of the third aspect, the determining module is further configured to determine the horizontal division size and the vertical division size when the manner of division into the prediction block that is acquired by the first acquiring module is a square division manner, where the horizontal division size is equal to the vertical division size.

With reference to the second possible implementation manner of the third aspect, in a twelfth possible implementation manner of the third aspect, the determining submodule is further configured to when the manner of division into the prediction block that is acquired by the first acquiring module is a square division manner, determine the horizontal division size as M and determine the vertical division size as M.

With reference to the third aspect, in a thirteenth possible implementation manner of the third aspect, the division module is further configured to when the horizontal division size is greater than a size of a horizontal side of the prediction block, divide the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, divide the prediction block into the prediction subblock according to the horizontal division size, where a size of a horizontal side of the prediction subblock is equal to the horizontal division size, or when the vertical division size is greater than a size of a vertical side of the prediction block, divide the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, divide the prediction block into the prediction subblock according to the vertical division size, where a size of a vertical side of the prediction subblock is equal to the vertical division size.

With reference to any one of the third aspect or the first to the thirteenth possible implementation manners of the third aspect, in a fourteenth possible implementation manner of the third aspect, according to the horizontal division size and the vertical division size, sizes of horizontal sides of all obtained prediction subblocks are the same, and sizes of vertical sides of all obtained prediction subblocks are the same.

With reference to any one of the third aspect or the first to the fourteenth possible implementation manners of the third aspect, in a fifteenth possible implementation manner of the third aspect, the encoding device further includes a second acquiring module configured to acquire motion information according to the prediction subblock obtained by the division module.

With reference to the fifteenth possible implementation manner of the third aspect, in a sixteenth possible implementation manner of the third aspect, the second acquiring module is further configured to acquire the motion information from a reference view image or a texture image according to the prediction subblock obtained by the division module.

According to a fourth aspect, an encoding device is provided, including a first acquiring module configured to acquire a size of a horizontal side and a size of a vertical side that are of a prediction block, a second acquiring module configured to acquire a base size, and a division module configured to determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

With reference to the fourth aspect, in a first possible implementation manner of the fourth aspect, the division module is further configured to when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, divide the prediction block into one prediction subblock according to the size of the horizontal side of the prediction block and the size of the vertical side of the prediction block.

With reference to the fourth aspect, in a second possible implementation manner of the fourth aspect, that the division module determines a size of a horizontal side of a prediction subblock according to a magnitude relationship between the size of the horizontal side of the prediction block and the base size or a magnitude relationship between the size of the vertical side of the prediction block and the base size, and determines a size of a vertical side of the prediction subblock according to the magnitude relationship between the size of the horizontal side of the prediction block and the base size or the magnitude relationship between the size of the vertical side of the prediction block and the base size includes when a preset condition is met, setting the size of the horizontal side of the prediction subblock to the size of the horizontal side of the prediction block and setting the size of the vertical side of the prediction subblock to the size of the vertical side of the prediction block, or when the preset condition is not met, setting the size of the horizontal side of the prediction subblock to the base size and setting the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

With reference to any one of the fourth aspect, the first implementation manner of the fourth aspect, or the second possible implementation manner of the fourth aspect, in a third possible implementation manner of the fourth aspect, the encoding device further includes a third acquiring module configured to acquire motion information according to the prediction subblock.

With reference to the third possible implementation manner of the fourth aspect, in a fourth possible implementation manner of the fourth aspect, the third acquiring module is further configured to acquire the motion information from a reference view image or a texture image according to the prediction subblock obtained by the division module.

According to a fifth aspect, a decoding device is provided, where the decoding device includes a first acquiring module configured to acquire a manner of division into a prediction block, where the manner of division into the prediction block is a horizontal division manner, a vertical division manner, or a square division manner, a determining module configured to determine a horizontal division size and a vertical division size according to the manner of division into the prediction block that is acquired by the first acquiring module, and a division module configured to divide the prediction block into at least one prediction subblock according to the horizontal division size and the vertical division size that are determined by the determining module.

With reference to the fifth aspect, in a first possible implementation manner of the fifth aspect, a size of a horizontal side of the prediction subblock is equal to the horizontal division size, and a size of a vertical side of the prediction subblock is equal to the vertical division size.

With reference to the fifth aspect or the first possible implementation manner of the fifth aspect, in a second possible implementation manner of the fifth aspect, the determining module includes an acquiring submodule configured to acquire a base size M, where M is a positive integer, and a determining submodule configured to determine the horizontal division size and the vertical division size according to the manner of division into the prediction block and based on the base size M, where the manner of division into the prediction block is acquired by the first acquiring module, and the base size M is acquired by the acquiring submodule.

With reference to any one of the fifth aspect, the first implementation manner of the fifth aspect, or the second possible implementation manner of the fifth aspect, in a third possible implementation manner of the fifth aspect, the determining module is further configured to determine the horizontal division size and the vertical division size when the manner of division into the prediction block that is acquired by the first acquiring module is a horizontal division manner, where the horizontal division size is greater than the vertical division size.

With reference to the second possible implementation manner of the fifth aspect, in a fourth possible implementation manner of the fifth aspect, the determining submodule is further configured to when the manner of division into the prediction block that is acquired by the first acquiring module is a horizontal division manner, determine the horizontal division size as J and determine the vertical division size as K, where J and K are positive integers, J is greater than M, and K is less than M.

With reference to the fourth possible implementation manner of the fifth aspect, in a fifth possible implementation manner of the fifth aspect, a value of J is a corresponding value obtained by shifting M leftward by p places, and a value of K is a corresponding value obtained by shifting M rightward by p places, where p is a positive integer.

With reference to the fifth possible implementation manner of the fifth aspect, in a sixth possible implementation manner of the fifth aspect, $p=1$.

With reference to any one of the fifth aspect, the first implementation manner of the fifth aspect, or the second possible implementation manner of the fifth aspect, in a seventh possible implementation manner of the fifth aspect, the determining module is further configured to determine the horizontal division size and the vertical division size when the manner of division into the prediction block that is acquired by the first acquiring module is a vertical division manner, where the horizontal division size is less than the vertical division size.

With reference to the second possible implementation manner of the fifth aspect, in an eighth possible implementation manner of the fifth aspect, the determining submodule is further configured to when the manner of division into the prediction block that is acquired by the first acquiring module is a vertical division manner, determine the horizontal division size as Y and determine the vertical division size as Z, where Y and Z are positive integers, Y is less than M, and Z is greater than M.

With reference to the eighth possible implementation manner of the fifth aspect, in a ninth possible implementation manner of the fifth aspect, a value of Y is a corresponding value obtained by shifting M rightward by q places, and a value of Z is a corresponding value obtained by shifting M leftward by q places, where q is a positive integer.

With reference to the ninth possible implementation manner of the fifth aspect, in a tenth possible implementation manner of the fifth aspect, $q=1$.

With reference to any one of the fifth aspect, the first implementation manner of the fifth aspect, or the second possible implementation manner of the fifth aspect, in an eleventh possible implementation manner of the fifth aspect, the determining module is further configured to determine the horizontal division size and the vertical division size when the manner of division into the prediction block that is acquired by the first acquiring module is a square division manner, where the horizontal division size is equal to the vertical division size.

With reference to the second possible implementation manner of the fifth aspect, in a twelfth possible implementation manner of the fifth aspect, the determining submodule is further configured to when the manner of division into the prediction block that is acquired by the first acquiring module is a square division manner, determine the horizontal division size as M and determine the vertical division size as M.

With reference to the fifth aspect, in a thirteenth possible implementation manner of the fifth aspect, the division module is further configured to when the horizontal division size is greater than a size of a horizontal side of the prediction block, divide the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, divide the prediction block into the prediction subblock according to the horizontal division size, where a size of a horizontal side of the prediction subblock is equal to the horizontal division size, or when the vertical division size is greater than a size of a vertical side of the prediction block, divide the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, divide the prediction block into the prediction subblock according to the vertical division size, where a size of a vertical side of the prediction subblock is equal to the vertical division size.

With reference to any one of the fifth aspect or the first to the thirteenth possible implementation manners of the fifth aspect, in a fourteenth possible implementation manner of the fifth aspect, according to the horizontal division size and the vertical division size, sizes of horizontal sides of all obtained prediction subblocks are the same, and sizes of vertical sides of all obtained prediction subblocks are the same.

With reference to any one of the fifth aspect or the first to the fourteenth possible implementation manners of the fifth aspect, in a fifteenth possible implementation manner of the fifth aspect, the decoding device further includes a second acquiring module configured to acquire motion information according to the prediction subblock obtained by the division module.

With reference to the fifteenth possible implementation manner of the fifth aspect, in a sixteenth possible implementation manner of the fifth aspect, the second acquiring module is further configured to acquire the motion information from a reference view image or a texture image according to the prediction subblock obtained by the division module.

According to a sixth aspect, a decoding device is provided, including a first acquiring module configured to acquire a size of a horizontal side and a size of a vertical side that are of a prediction block, a second acquiring module configured to acquire a base size, and a division module configured to determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

With reference to the sixth aspect, in a first possible implementation manner of the sixth aspect, the division module is further configured to when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, divide the prediction block into one prediction subblock according to the size of the horizontal side of the prediction block and the size of the vertical side of the prediction block.

With reference to the sixth aspect, in a second possible implementation manner of the sixth aspect, that the division module determines a size of a horizontal side of a prediction subblock according to a magnitude relationship between the size of the horizontal side of the prediction block and the base size or a magnitude relationship between the size of the vertical side of the prediction block and the base size, and determines a size of a vertical side of the prediction subblock according to the magnitude relationship between the size of the horizontal side of the prediction block and the base size or the magnitude relationship between the size of the vertical side of the prediction block and the base size includes when a preset condition is met, setting the size of the horizontal side of the prediction subblock to the size of the horizontal side of the prediction block and setting the size of the vertical side of the prediction subblock to the size of the vertical side of the prediction block, or when the preset condition is not met, setting the size of the horizontal side of the prediction subblock to the base size and setting the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

With reference to any one of the sixth aspect, the first implementation manner of the sixth aspect, or the second possible implementation manner of the sixth aspect, in a third possible implementation manner of the sixth aspect, the decoding device further includes a third acquiring module configured to acquire motion information according to the prediction subblock.

With reference to the third possible implementation manner of the sixth aspect, in a fourth possible implementation manner of the sixth aspect, the third acquiring module is further configured to acquire the motion information from a reference view image or a texture image according to the prediction subblock obtained by the division module.

Based on the foregoing technical solutions, according to the method for dividing a prediction block, the encoding device, and the decoding device in the embodiments of the present application, a horizontal division size and a vertical division size are determined according to a manner of division into the prediction block, and the prediction block is divided according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

BRIEF DESCRIPTION OF DRAWINGS

To describe the technical solutions in the embodiments of the present application more clearly, the following briefly describes the accompanying drawings needed for describing the embodiments of the present application. The accompanying drawings in the following description show merely some embodiments of the present application, and persons of ordinary skill in the art may still derive other drawings from these accompanying drawings without creative efforts.

FIG. 1A, FIG. 1B, FIG. 1C, and FIG. 1D are schematic diagrams of symmetric division manners of code blocks;

FIG. 2A, FIG. 2B, FIG. 2C, and FIG. 2D are schematic diagrams of asymmetric division manners of code blocks;

FIG. 3 is a schematic flowchart of a method for dividing a prediction block according to an embodiment of the present application;

FIG. 7A, FIG. 7B, and FIG. 7C are a schematic diagram of an undivided prediction block, a schematic diagram of division of a prediction block in the prior art, and a schematic diagram of division of a prediction block according to an embodiment of the present application, respectively;

FIG. 8A, FIG. 8B, and FIG. 8C are a schematic diagram of an undivided prediction block, a schematic diagram of division of a prediction block in the prior art, and a schematic diagram of division of a prediction block according to an embodiment of the present application, respectively;

DESCRIPTION OF EMBODIMENTS

Figure 4A:
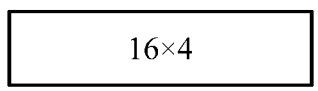
FIG. 4A, FIG. 4B, and FIG. 4C are a schematic diagram of an undivided prediction block, a schematic diagram of division of a prediction block in the prior art, and a schematic diagram of division of a prediction block according to an embodiment of the present application, respectively.

The following clearly describes the technical solutions in the embodiments of the present application with reference to the accompanying drawings in the embodiments of the present application. The described embodiments are a part rather than all of the embodiments of the present application. All other embodiments obtained by persons of ordinary skill in the art based on the embodiments of the present application without creative efforts shall fall within the protection scope of the present application.

In the prior art, a commonly used symmetric division manner for dividing a code block into a prediction block includes as shown in FIG. 1A, a 2N×2N division manner in which a code block is divided into only one prediction block, that is, the code block is not divided into smaller image subblocks, as shown in FIG. 1B, a 2N×N division manner in which a code block is divided into two upper and lower equal-sized prediction blocks, as shown in FIG. 1C, an N×2N division manner in which a code block is divided into two left and right equal-sized prediction blocks, and as shown in FIG. 1D, an N×N division manner in which a code block is divided into four equal-sized prediction blocks, where N is any positive integer.

In addition, alternatively, a code block may be divided into a prediction block in an asymmetric division manner, as shown in FIG. 2A to FIG. 2D. In division manners shown in FIG. 2A and FIG. 2B, a code block is divided into two upper and lower unequal-sized rectangular prediction blocks. In two prediction blocks obtained in a 2N×nU division manner shown in FIG. 2A, sizes of a horizontal side and a vertical side of the upper prediction block are 2N and 0.5N, and sizes of a horizontal side and a vertical side of the lower prediction block are 2N and 1.5N, where 2N×nU indicates that a division line is shifted upward by 0.5N relative to a horizontal bisector of the code block. In two prediction blocks obtained in a 2N×nD division manner shown in FIG. 2B, sizes of a horizontal side and a vertical side of the upper prediction block are 2N and 1.5N, and sizes of a horizontal side and a vertical side of the lower prediction block are 2N and 0.5N, where 2N×nD indicates that a division line is shifted downward by 0.5N relative to a horizontal bisector of the code block. In division manners shown in FIG. 2C and FIG. 2D, a code block is divided into two left and right unequal-sized rectangular prediction blocks. In two prediction blocks obtained in an nL×2N division manner shown in FIG. 2C, sizes of a horizontal side and a vertical side of the left prediction block are 0.5N and 2N, and sizes of a horizontal side and a vertical side of the right prediction block are 1.5N and 2N, where nL×2N indicates that a division line is shifted leftward by 0.5N relative to a vertical bisector of the code block. In two prediction blocks obtained in an nR×2N division manner shown in FIG. 2D, sizes of a horizontal side and a vertical side of the left prediction block are 1.5N and 2N, and sizes of a horizontal side and a vertical side of the right prediction block are 0.5N and 2N, where nR×2N indicates that a division line is shifted rightward by 0.5N relative to a vertical bisector of the code block.

The foregoing process of dividing a code block to obtain a prediction block is referred to as a manner of division into a prediction block in the present application. The division manners 2N×N, 2N×nU, and 2N×nD are horizontal division manners. When the manner of division into a prediction block is a horizontal division manner, a size of a horizontal side of the prediction block is greater than a size of a vertical side of the prediction block. The division manners N×2N, nL×2N, and nR×2N are vertical division manners. When the manner of division into a prediction block is a vertical division manner, a size of a horizontal side of the prediction block is less than a size of a vertical side of the prediction block. The division manners 2N×2N and N×N are square division manners. When the manner of division into a prediction block is a square division manner, a size of a horizontal side of the prediction block is equal to a size of a vertical side of the prediction block. Alternatively, a size of a horizontal side of the prediction block may be referred to as a width, and a size of a vertical side of the prediction block may be referred to as a height.

The foregoing interframe compression method is also used in three-dimensional video image coding. A three-dimensional video system includes two types of images a texture image and a depth image. The texture image includes luminance and color information of the image, and the depth image includes depth information of the texture image. Because a three-dimensional video generally includes multiple texture images, the three-dimensional video system generally also includes multiple depth images, where each texture image or depth image is referred to as one view. To improve compression efficiency of the three-dimensional video, in addition to the information about the image that is used for video coding/compression, information between texture images may also be used for encoding. A depth image corresponding to the texture image provides depth information for coding prediction between texture images. For the current texture image, a neighboring texture image may be used for predictive coding, and in this case, the neighboring texture image is referred to as a reference view image or a reference view. The reference view image is also a type of reference frame.

An inter-view prediction technology includes an inter-view motion vector candidate (IVMC) technology and a motion parameter inheritance (MPI) technology. Technologies such as IVMC and MPI involve obtaining a reference block from a reference frame, and obtaining motion information according to the reference block, where the motion information includes a motion vector, a reference frame index value, and the like. In the IVMC technology, a reference block is obtained from a reference view, and motion information is obtained according to the reference block. MPI is used for encoding or decoding a depth image, and for a block in the depth image, motion information of the block is obtained using motion information of a block of a texture image at a corresponding location (the corresponding texture block). In the prior art, a prediction subblock technology is introduced so to obtain a more accurate reference motion vector. A basic idea of the prediction subblock technology is dividing a current prediction block into smaller prediction subblocks. For example, the current prediction block may be divided into multiple prediction subblocks of a smaller size (for example, the size is 8×8), and reference motion vectors are obtained from a reference image in units of prediction subblocks obtained by means of division. A current prediction block may be divided into multiple prediction subblocks using the prediction subblock technology in order to obtain more reference motion vectors, which can improve encoding quality.

However, the following two problems exist in the existing prediction subblock technology First, because a size of a prediction subblock is preset, for example, the size of a prediction subblock is preset to 8×8, when a size of a side of a prediction block is less than the preset size of a prediction subblock, the side is not divided. For example, when a size of a prediction block is 16×4, a size of a vertical side of the prediction block is 4 and is less than 8. Therefore, the vertical side is not divided, and in this case, the 16×4 prediction block is divided to obtain two prediction subblocks whose size is 8×4. When a size of a side of a prediction block is not a multiple of 8, the side is not divided. For example, when a size of a prediction block is 16×12, a size of a vertical side of the prediction block is 12 and is not a multiple of 8. Therefore, the vertical side is not divided, and in this case, the 16×12 prediction block is divided to obtain two prediction subblocks whose size is 8×12. For another example, when a size of a prediction block is 12×12, and a size of a prediction subblock is preset to 8×8, because neither a size of a horizontal side of the prediction block nor a size of a vertical side is a multiple of 8, a size of a prediction subblock obtained by means of division is still 12×12.

A problem of such a division method is introducing some prediction subblocks whose sizes are not a size used in an existing encoding/decoding device, for example, a prediction subblock whose size is 8×12. However, before the prediction subblock technology is introduced, the blocks whose sizes are not the size used in the existing encoding/decoding device do not exist. Therefore, because some prediction subblock sizes are added due to the prediction subblock technology, implementation load on an encoding/decoding system is increased.

Sizes of a code block used in the existing encoding/decoding device include 64×64, 32×32, 16×16, 8×8, and the like, and commonly used division manner for dividing a code block in the encoding/decoding device include 2N×2N, 2N×N, N×2N, 2N×nU, 2N×nD, nL×2N, nR×2N, and N×N. In addition, because of consideration that a size of a prediction block or a prediction subblock in a commonly used encoding/decoding device is not less than 4, sizes of the prediction block or the prediction subblock include 64×64, 64×32, 32×64, 64×16, 16×64, 32×32, 32×16, 16×32, 32×8, 8×32, 16×16, 16×4, 4×16, 16×8, 8×16, 8×8, 8×4, 4×8, 4×4, and the like.

Second, in the existing prediction subblock technology, prediction subblocks are all square, which cannot reflect texture of the prediction block, and this affects accuracy of an acquired reference motion vector. An idea of the present application develops exactly based on an intention to resolve the foregoing two problems.

FIG. 3 shows a schematic flowchart of a method 100 for dividing a prediction block according to an embodiment of the present application. The method 100 may be executed by an encoding device or a decoding device, and the method 100 includes S110. Acquire a manner of division into a prediction block, where the manner of division into the prediction block is a horizontal division manner, a vertical division manner, or a square division manner. When the manner of division into the prediction block is a horizontal division manner (that is, a division manner such as 2N×N, 2N×nU, or 2N×nD), a size of a horizontal side of the prediction block is greater than a size of a vertical side of the prediction block. When the manner of division into the prediction block is a vertical division manner (that is, a division manner such as N×2N, nL×2N, or nR×2N), a size of a horizontal side of the prediction block is less than a size of a vertical side of the prediction block. When the manner of division into the prediction block is a square division manner (that is, a division manner such as 2N×2N or N×N), a size of a horizontal side of the prediction block is equal to a size of a vertical side of the prediction block. Generally, texture of the prediction block is related to a division manner used for obtaining the prediction block. For example, image texture corresponding to a prediction block obtained in a horizontal division manner generally tends to be horizontal texture.

S120. Determine a horizontal division size and a vertical division size according to the manner of division into the prediction block. That is, according to the manner of division into the prediction block, the horizontal division size and the vertical division size that are used as reference are determined for division into a prediction subblock. For example, when the manner of division into the prediction block is a horizontal division manner, the size of the horizontal side of the prediction block is greater than the size of the vertical side of the prediction block, and it is determined that the horizontal division size is also greater than the vertical division size. When the manner of division into the prediction block is a vertical division manner, the size of the horizontal side of the prediction block is less than the size of the vertical side of the prediction block, and it is determined that the horizontal division size is also less than the vertical division size. When the manner of division into the prediction block is a square division manner, the size of the horizontal side of the prediction block is equal to the size of the vertical side of the prediction block, and it is determined that the horizontal division size should also be equal to the vertical division size.

S130. Divide the prediction block into at least one prediction subblock according to the horizontal division size and the vertical division size. It should be understood that, herein, there are two cases. In one case, a size of a horizontal side of the prediction subblock obtained by means of division is equal to the horizontal division size, and a size of a vertical side of the prediction subblock is equal to the vertical division size. In another case, the horizontal division size and the vertical division size are reference factors needed for division of the prediction block, but a size of a horizontal side of the prediction subblock obtained by means of division is not equal to the horizontal division size, or a size of a vertical side of the prediction subblock is not equal to the vertical division size.

Therefore, according to the method for dividing a prediction block in this embodiment of the present application, a horizontal division size and a vertical division size are determined according to a manner of division into the prediction block, and the prediction block is divided according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Corresponding to the foregoing two cases in which the prediction block is divided into the at least one prediction subblock according to the horizontal division size and the vertical division size, in one embodiment, a size of a horizontal side of the prediction subblock is equal to the horizontal division size, and a size of a vertical side of the prediction subblock is equal to the vertical division size.

In another embodiment, when the horizontal division size is greater than a size of a horizontal side of the prediction block, the prediction block is divided into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, the prediction block is divided into the prediction subblock according to the horizontal division size, where a size of a horizontal side of the prediction subblock is equal to the horizontal division size, or when the vertical division size is greater than a size of a vertical side of the prediction block, the prediction block is divided into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, the prediction block is divided into the prediction subblock according to the vertical division size, where a size of a vertical side of the prediction subblock is equal to the vertical division size.

The former case is described in detail later, and the latter case is described now using a specific example. When the determined horizontal division size is greater than the size of the horizontal side of the prediction block, division is not performed in a horizontal direction of the prediction block. For example, a prediction block is obtained in a horizontal division manner, and a size of the prediction block is 8×4, that is, a size of a horizontal side is 8, and a size of a vertical side is 4. The manner of division into the prediction block is a horizontal division manner, and accordingly, shifting is performed on a base size M (it is assumed that the base size is 8) to obtain that the horizontal division size and the vertical division size are 16 and 4 respectively. In this case, because the size of the horizontal side of the prediction block is 8, and the value is less than the horizontal division size 16, the horizontal side of the prediction block is not divided, the size of the vertical side of the prediction block is 4, the value is equal to the vertical division size 4, and the size of the vertical side of the prediction subblock obtained by dividing the prediction block is still 4. Finally, one prediction subblock whose size is 8×4 is obtained by means of division.

Optionally, in an embodiment, according to the horizontal division size and the vertical division size, sizes of horizontal sides of all obtained prediction subblocks are the same, and sizes of vertical sides of all obtained prediction subblocks are the same.

Optionally, in an embodiment of the present application, the determining a horizontal division size and a vertical division size according to the manner of division into the prediction block includes acquiring a base size M, where M is a positive integer, and determining the horizontal division size and the vertical division size according to the manner of division into the prediction block and based on the base size M.

Further, all prediction subblocks in the prior art are square. If the size of the horizontal side of the prediction subblock obtained by dividing the prediction block is M, and the size of the vertical side of the prediction subblock is also M, M may be used as a base size applied to this embodiment of the present application, which is not limited in this embodiment of the present application. The base size of the prediction subblock may be preset to any positive integer. Because the size of the prediction block in the prior art is generally a multiple of 4, the base size of the prediction subblock may be generally set to values such as 4, 8, and 16. The horizontal division size and the vertical division size are determined according to the manner of division into the prediction block and based on the base size M. When the prediction block is divided into a prediction subblock, the horizontal division size and the vertical division size are used as reference in order to ensure that texture of the prediction subblock is consistent with texture of the prediction block, and improve accuracy of a reference motion vector acquired using the prediction subblock.

For example, when the manner of division into the prediction block is a horizontal division manner, that is, when the size of the horizontal side of the prediction block is greater than the size of the vertical side of the prediction block, the horizontal division size is obtained by increasing M, and the vertical division size is obtained by reducing M. After the prediction block is divided with reference to the horizontal division size and the vertical division size, the size of the horizontal side of the prediction subblock is also greater than the size of the vertical side of the prediction subblock. When the manner of division into the prediction block is a vertical division manner, that is, when the size of the horizontal side of the prediction block is less than the size of the vertical side of the prediction block, the horizontal division size is obtained by reducing M, and the vertical division size is obtained by increasing M. After the prediction block is divided with reference to the horizontal division size and the vertical division size, the size of the horizontal side of the prediction subblock is also less than the size of the vertical side of the prediction subblock. When the manner of division into the prediction block is a square division manner, that is, when the size of the horizontal side of the prediction block is equal to the size of the vertical side of the prediction block, the horizontal division size and the vertical division size may be determined as M. After the prediction block is divided with reference to the horizontal division size and the vertical division size, the size of the horizontal side of the prediction subblock is also equal to the size of the vertical side of the prediction subblock.

Therefore, according to the method for dividing a prediction block in this embodiment of the present application, a horizontal division size and a vertical division size are determined according to a manner of division into the prediction block, and the prediction block is divided according to the horizontal division size and the vertical division size such that texture of a prediction subblock is consistent with texture of the prediction block, and accuracy of a reference motion vector acquired using the prediction subblock can be improved.

Optionally, in this embodiment of the present application, the determining the horizontal division size and the vertical division size according to the manner of division into the prediction block and based on the base size M includes determining the horizontal division size and the vertical division size according to the manner of division into the prediction block and based on the base size M such that a difference between $M^2$ and an area of a rectangular block formed with the horizontal division size and the vertical division size is less than a specific threshold. After the prediction block is divided into the at least one prediction subblock, the size of the horizontal side of the prediction subblock is equal to the horizontal division size, and the size of the vertical side of the prediction subblock is equal to the vertical division size such that a difference between $M^2$ and an area of the prediction subblock is less than a specific threshold.

Preferably, the area of the rectangular block formed with the horizontal division size and the vertical division size is made to $M^2$ such that the area of the prediction subblock is $M^2$. Further, based on the base size M, the horizontal division size may be increased by a specific quantity of times relative to M, and the vertical division size is also reduced by the same quantity of times relative to M, alternatively, the horizontal division size is reduced by a specific quantity of times relative to M, and the vertical division size is also increased by the same quantity of times relative to M such that the area of the rectangular block formed with the horizontal division size and the vertical division size is $M^2$, and the area of the prediction subblock remains $M^2$.

Therefore, according to the method for dividing a prediction block in this embodiment of the present application, a horizontal division size and a vertical division size are adjusted according to a manner of division into the prediction block, and the prediction block is divided according to the horizontal division size and the vertical division size such that finally an area of a prediction subblock remains consistent with an area of a prediction subblock of a base size. Therefore, it can be ensured that a quantity of prediction subblocks obtained by means of division is consistent with a quantity of prediction subblocks obtained by means of division based on the base size, and a quantity of obtained reference motion vectors does not change due to changes in a width size and a height size of the prediction subblock.

It should be understood that, in this embodiment of the present application, when the manner of division into the prediction block is a horizontal division manner or a vertical division manner, the horizontal division size and the vertical division size need to be adjusted based on the base size M. M is a positive integer, and the adjustment herein may be performing left shifting or right shifting on a binary form of M. For example, when M=8, the binary form of M is 1000, and M shifted leftward by one bit is 10000 (which is 16 expressed in a decimal form), and shifted rightward by one bit is 100 (which is 4 expressed in a decimal form). For another example, when M=5, the binary form of M is 101, and M shifted leftward by one bit is 1010 (which is 10 expressed in a decimal form), and shifted rightward by one bit is 10 (which is 2 expressed in a decimal form). For still another example, when M=6, the binary form of M is 110, and M shifted leftward by one bit is 1100 (which is 12 expressed in a decimal form), and shifted rightward by one bit is 11 (which is 3 expressed in a decimal form). Theoretically, left shifting or right shifting may be performed on a decimal form of M. In addition, adjusting the size of the horizontal side and the size of the vertical side that are of the prediction subblock may be simply increasing or reducing M by a corresponding quantity of times, which is not limited in this embodiment of the present application.

Optionally, in an embodiment, the determining a horizontal division size and a vertical division size according to the manner of division into the prediction block includes determining the horizontal division size and the vertical division size when the manner of division into the prediction block is a horizontal division manner, where the horizontal division size is greater than the vertical division size.

Further, when the manner of division into the prediction block is a horizontal division manner, that is, when the size of the horizontal side of the prediction block is greater than the size of the vertical side of the prediction block, the horizontal division size and the vertical division size are determined such that the horizontal division size is greater than the vertical division size, and finally the prediction block is divided into the at least one prediction subblock, where the size of the horizontal side of the prediction subblock is greater than the size of the vertical side of the prediction subblock. To enable the horizontal division size to be greater than the vertical division size, a base size M may be set, the horizontal division size is increased relative to the base size M, and the vertical division size is decreased relative to the base size M. Subsequently, the size of the horizontal side and the size of the vertical side that are of the prediction subblock are equal to the horizontal division size and the vertical division size respectively. Alternatively, a base size may not be set, provided that the size of the horizontal side of the prediction subblock is greater than the size of the vertical side of the prediction subblock using another method, which is not limited in this embodiment of the present application.

Therefore, according to the method for dividing a prediction block in this embodiment of the present application, a horizontal division size and a vertical division size are adjusted according to a manner of division into the prediction block, and the prediction block is divided according to the horizontal division size and the vertical division size such that texture of a prediction subblock is consistent with texture of the prediction block, that is, it is ensured that a manner of division into the prediction subblock is consistent with the manner of division into the prediction block, and accuracy of a reference motion vector acquired using the prediction subblock can be improved.

Optionally, in an embodiment, the determining the horizontal division size and the vertical division size according to the manner of division into the prediction block and based on the base size M includes when the manner of division into the prediction block is a horizontal division manner, based on the base size M, determining the horizontal division size as J and determining the vertical division size as K, where J and K are positive integers, J is greater than M, and K is less than M.

Further, when the manner of division into the prediction block is a horizontal division manner, the horizontal division size is determined as J and the vertical division size is determined as K, where J is greater than M and K is less than M such that an area of a finally obtained prediction subblock may remain as consistent as possible with an area of a prediction subblock of the base size. Therefore, it can be ensured that a quantity of prediction subblocks obtained by means of division is as consistent as possible with a quantity of prediction subblocks obtained by means of division based on the base size, and a quantity of obtained reference motion vectors does not change excessively due to changes in a width size and a height size of the prediction subblock.

Preferably, in an embodiment, a value of J is a corresponding value obtained by shifting M leftward by p places, and a value of K is a corresponding value obtained by shifting M rightward by p places, where p is a positive integer. Herein, the shifting leftward by p places or the shifting rightward by p places may be performing left shifting or right shifting on a binary form of M, or may be performing left shifting or right shifting on a decimal form of M, which is not limited in this embodiment of the present application.

Figure 4B:
Figure 4C:
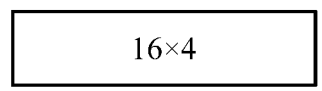

The method in this embodiment of the present application is described in detail with reference to several specific examples as follows As shown in FIG. 4A, the prediction block is obtained in a horizontal division manner, and a size of the prediction block is 16×4, that is, a size of a horizontal side is 16, and a size of a vertical side is 4. The base size is 8, that is, a size of a basic prediction subblock is 8×8. In the existing division method, because the size of the horizontal side of the prediction block is 16, division is performed in a horizontal direction, and the prediction block may be divided into two prediction subblocks, the size of the vertical side of the prediction block is 4, and is less than the base size 8, and division is not performed in a vertical direction. A final division result is shown in FIG. 4B, and the prediction block is divided into two prediction subblocks whose size is 8×4. When the method 100 in this embodiment of the present application is used, the manner of division into the prediction block is first determined as a horizontal division manner, and then, the horizontal division size J is determined as M<<1 (that is, 8<<1=16) and the vertical division size K is determined as M>>1 (that is, 8>>1=4). During division of the prediction block, a size of a horizontal side of the prediction subblock is equal to the horizontal division size, and a size of a vertical side of the prediction subblock is equal to the vertical division size. A final division result is shown in FIG. 4C, that is, the prediction block is not further divided, or the prediction block is divided into one prediction subblock whose size is 16×4. A division result given in this example is different from that in the prior art. When the method 100 in this embodiment of the present application is used, uniform division is performed according to the method 100. Then, after a prediction block is divided to 16×4, no further division is performed. In this way, a division result can be kept consistent.

Figure 5A:
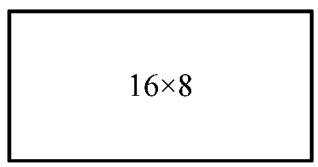
FIG. 5A, FIG. 5B, and FIG. 5C are a schematic diagram of an undivided prediction block, a schematic diagram of division of a prediction block in the prior art, and a schematic diagram of division of a prediction block according to an embodiment of the present application, respectively.
Figure 5B:
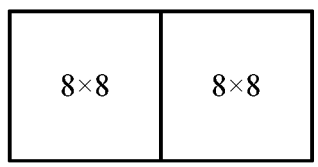
Figure 5C:
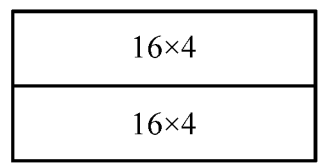

As shown in FIG. 5A, the prediction block is obtained in a horizontal division manner, and a size of the prediction block is 16×8, that is, a size of a horizontal side is 16, and a size of a vertical side is 8. The base size is 8, that is, a size of a basic prediction subblock is 8×8. In the existing division method, because the size of the horizontal side of the prediction block is 16, division is performed in a horizontal direction, and the prediction block may be divided into two prediction subblocks, the size of the vertical side of the prediction block is 8, and division is not performed in a vertical direction. A final division result is shown in FIG. 5B, and the prediction block is divided into two prediction subblocks whose size is 8×8. Texture of the prediction subblock whose size is 8×8 is inconsistent with texture of the prediction block, which is unfavorable to accuracy of a reference motion vector acquired using the prediction subblock. When the method 100 in this embodiment of the present application is used, the manner of division into the prediction block is first determined as a horizontal division manner, and then, the horizontal division size J is determined as M<<1 (that is, 8<<1=16) and the vertical division size K is determined as M>>1 (that is, 8>>1=4). During division of the prediction block, a size of a horizontal side of the prediction subblock is equal to the horizontal division size, and a size of a vertical side of the prediction subblock is equal to the vertical division size. A final division result is shown in FIG. 5C, that is, the prediction block is divided into two prediction subblocks whose size is 16×4.

Figure 6A:
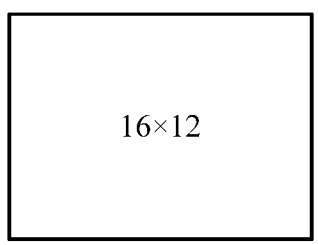
FIG. 6A, FIG. 6B, and FIG. 6C are a schematic diagram of an undivided prediction block, a schematic diagram of division of a prediction block in the prior art, and a schematic diagram of division of a prediction block according to an embodiment of the present application, respectively.
Figure 6B:
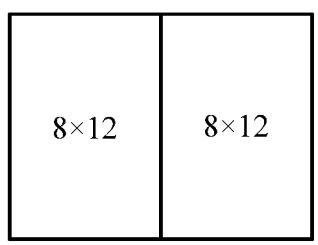
Figure 6C:
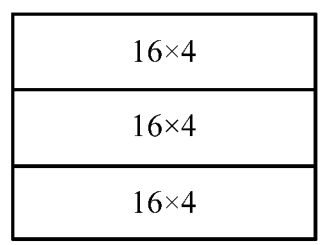

As shown in FIG. 6A, the prediction block is obtained in a horizontal division manner, and a size of the prediction block is 16×12, that is, a size of a horizontal side is 16, and a size of a vertical side is 12. The base size is 8, that is, a size of a basic prediction subblock is 8×8. In the existing division method, because the size of the horizontal side of the prediction block is 16, division is performed in a horizontal direction, and the prediction block may be divided into two prediction subblocks, the size of the vertical side of the prediction block is 12 and 12 is not an integer multiple of the base size 8, and division is not performed in a vertical direction. A final division result is shown in FIG. 6B, and the prediction block is divided into two prediction subblocks whose size is 8×12, where the size 8×12 does not belong to a size used in an existing encoding/decoding device. When the method 100 in this embodiment of the present application is used, the manner of division into the prediction block is first determined as a horizontal division manner, and then, the horizontal division size J is determined as M<<1 (that is, 8<<1=16) and the vertical division size K is determined as M>>1 (that is, 8>>1=4). During division of the prediction block, a size of a horizontal side of the prediction subblock is equal to the horizontal division size, and a size of a vertical side of the prediction subblock is equal to the vertical division size. A final division result is shown in FIG. 6C, that is, the prediction block is divided into three prediction subblocks whose size is 16×4.

Optionally, in an embodiment, the determining a horizontal division size and a vertical division size according to the manner of division into the prediction block includes determining the horizontal division size and the vertical division size when the manner of division into the prediction block is a vertical division manner, where the horizontal division size is less than the vertical division size.

Further, when the manner of division into the prediction block is a vertical division manner, that is, when the size of the horizontal side of the prediction block is less than the size of the vertical side of the prediction block, the horizontal division size and the vertical division size are determined such that the horizontal division size is less than the vertical division size, and finally the prediction block is divided into the at least one prediction subblock, where the size of the horizontal side of the prediction subblock is less than the size of the vertical side of the prediction subblock. To enable the horizontal division size to be less than the vertical division size, a base size M may be set, the horizontal division size is decreased relative to the base size M, and the vertical division size is increased relative to the base size M. Subsequently, the size of the horizontal side and the size of the vertical side that are of the prediction subblock are equal to the horizontal division size and the vertical division size respectively. Alternatively, a base size may not be set, provided that the size of the horizontal side of the prediction subblock is less than the size of the vertical side of the prediction subblock using another method, which is not limited in this embodiment of the present application.

Therefore, according to the method for dividing a prediction block in this embodiment of the present application, a horizontal division size and a vertical division size are adjusted according to a manner of division into the prediction block, and the prediction block is divided according to the horizontal division size and the vertical division size such that texture of a prediction subblock is consistent with texture of the prediction block, that is, it is ensured that a manner of division into the prediction subblock is consistent with the manner of division into the prediction block, and accuracy of a reference motion vector acquired using the prediction subblock can be improved.

Optionally, in an embodiment, the determining the horizontal division size and the vertical division size according to the manner of division into the prediction block and based on the base size M includes when the manner of division into the prediction block is a vertical division manner, based on the base size M, determining the horizontal division size as Y and determining the vertical division size as Z, where Y and Z are positive integers, Y is less than M, and Z is greater than M.

Further, when the manner of division into the prediction block is a vertical division manner, the horizontal division size is determined as Y and the vertical division size is determined as Z, where Y is less than M and Z is greater than M such that an area of a finally obtained prediction subblock may remain as consistent as possible with an area of a prediction subblock of the base size. Therefore, it can be ensured that a quantity of prediction subblocks obtained by means of division is as consistent as possible with a quantity of prediction subblocks obtained by means of division based on the base size, and a quantity of obtained reference motion vectors does not change excessively due to changes in a width size and a height size of the prediction subblock.

Preferably, in an embodiment, a value of Y is a corresponding value obtained by shifting M rightward by q places, and a value of Z is a corresponding value obtained by shifting M leftward by q places, where q is a positive integer. Herein, the shifting leftward by q places or the shifting rightward by q places may be performing left shifting or right shifting on a binary form of M, or may be performing left shifting or right shifting on a decimal form of M, which is not limited in this embodiment of the present application.

Similar to a case in which the manner of division into the prediction block is a horizontal division manner, for brevity, when the manner of division into the prediction block is a vertical division manner, detailed descriptions are provided using only one specific example.

As shown in FIG. 7A, the prediction block is obtained in a vertical division manner, and a size of the prediction block is 16×32, that is, a size of a horizontal side is 16, and a size of a vertical side is 32. The base size is 8, that is, a size of a basic prediction subblock is 8×8. In the existing division method, because the size of the horizontal side of the prediction block is 16, division is performed in a horizontal direction, and the prediction block may be divided into two prediction subblocks, the size of the vertical side of the prediction block is 32, division is performed in a vertical direction, and the prediction block may be divided into four prediction subblocks. A final division result is shown in FIG. 7B, and the prediction block is divided into eight prediction subblocks whose size is 8×8. Texture of the prediction subblock whose size is 8×8 is inconsistent with texture of the prediction block, which is unfavorable to accuracy of a reference motion vector acquired using the prediction subblock. When the method 100 in this embodiment of the present application is used, the manner of division into the prediction block is first determined as a vertical division manner, and then, the horizontal division size Y is determined as M>>1 (that is, 8>>1=4) and the vertical division size Z is determined as M<<1 (that is, 8<<1=16). During division of the prediction block, a size of a horizontal side of the prediction subblock is equal to the horizontal division size, and a size of a vertical side of the prediction subblock is equal to the vertical division size. A final division result is shown in FIG. 7C, that is, the prediction block is divided into eight prediction subblocks whose size is 4×16.

Optionally, in an embodiment, the determining a horizontal division size and a vertical division size according to the manner of division into the prediction block includes determining the horizontal division size and the vertical division size when the manner of division into the prediction block is a square division manner, where the horizontal division size is equal to the vertical division size.

Further, when the manner of division into the prediction block is a square division manner, that is, when the size of the horizontal side of the prediction block is equal to the size of the vertical side of the prediction block, the horizontal division size and the vertical division size are determined such that the horizontal division size is equal to the vertical division size, and finally the prediction block is divided into the at least one prediction subblock, where the size of the horizontal side of the prediction subblock is equal to the size of the vertical side of the prediction subblock. To enable the size of the horizontal side of the prediction subblock to be equal to the size of the vertical side of the prediction subblock, a base size M may be set, and either of the horizontal division size and the vertical division size is equal to the base size M. Subsequently, the size of the horizontal side and the size of the vertical side that are of the prediction subblock are equal to the horizontal division size and the vertical division size respectively. Alternatively, a base size may not be set, provided that the size of the horizontal side of the prediction subblock is equal to the size of the vertical side of the prediction subblock using another method, which is not limited in this embodiment of the present application.

Therefore, according to the method for dividing a prediction block in this embodiment of the present application, a horizontal division size and a vertical division size are adjusted according to a manner of division into the prediction block, and the prediction block is divided according to the horizontal division size and the vertical division size such that texture of a prediction subblock is consistent with texture of the prediction block, that is, it is ensured that a manner of division into the prediction subblock is consistent with the manner of division into the prediction block, and accuracy of a reference motion vector acquired using the prediction subblock can be improved.

Preferably, the determining the horizontal division size and the vertical division size according to the manner of division into the prediction block and based on the base size M includes when the manner of division into the prediction block is a square division manner, based on the base size M, determining the horizontal division size as M and determining the vertical division size as M.

Detailed descriptions are provided in the following using a specific example. As shown in FIG. 8A, the prediction block is obtained in a square division manner, and a size of the prediction block is 32×32, that is, a size of a horizontal side is 32, and a size of a vertical side is 32. The base size is 16, that is, a size of a basic prediction subblock is 16×16. In the existing division method, because the size of the horizontal side of the prediction block is 32, division is performed in a horizontal direction, and the prediction block may be divided into two prediction subblocks, the size of the vertical side of the prediction block is 32, division is performed in a vertical direction, and the prediction block may be divided into two prediction subblocks. A final division result is shown in FIG. 8B, and the prediction block is divided into four prediction subblocks whose size is 16×16. When the method 100 in this embodiment of the present application is used, the manner of division into the prediction block is first determined as a square division manner, and then, the horizontal division size is determined as M (that is, 16) and the vertical division size is determined as M (that is, 16). During division of the prediction block, a size of a horizontal side of the prediction subblock is equal to the horizontal division size, and a size of a vertical side of the prediction subblock is equal to the vertical division size. A final division result is shown in FIG. 8C, that is, the same as the division result in the prior art, the prediction block is divided into four prediction subblocks whose size is 16×16.

In the foregoing several examples, during determining of the horizontal division size and the vertical division size, when a horizontal division size obtained by means of shifting is greater than the size of the horizontal side of the prediction block, division is not performed in a horizontal direction of the prediction block. For example, a prediction block is obtained in a horizontal division manner, and a size of the prediction block is 8×4, that is, a size of a horizontal side is 8, and a size of a vertical side is 4. Because the base size of the prediction subblock is 8, and the manner of division into the prediction block is a horizontal division manner, the obtained horizontal division size and the obtained vertical division size are 16 and 4 respectively. In this case, because the size of the horizontal side of the prediction block is 8, and the value is less than the horizontal division size 16, the horizontal side of the prediction block is not divided, the size of the vertical side of the prediction block is 4, the value is equal to the vertical division size 4, the size of the vertical side of the prediction subblock obtained by dividing the prediction block is still 4, and finally one prediction subblock whose size is 8×4 is obtained by means of division.

Therefore, according to the method for dividing a prediction block in this embodiment of the present application, a horizontal division size and a vertical division size are determined according to a manner of division into the prediction block, and the prediction block is divided according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Optionally, in an embodiment, the method 100 may further include acquiring motion information according to the prediction subblock. In specific implementation, the motion information may be acquired from a reference view image or a texture image according to the prediction subblock. The texture of the prediction subblock obtained according to the method in this embodiment of the present application is consistent with the texture of the prediction block. Therefore, accuracy of a reference motion vector, in the motion information, obtained according to the prediction subblock is good.

Figure 9:
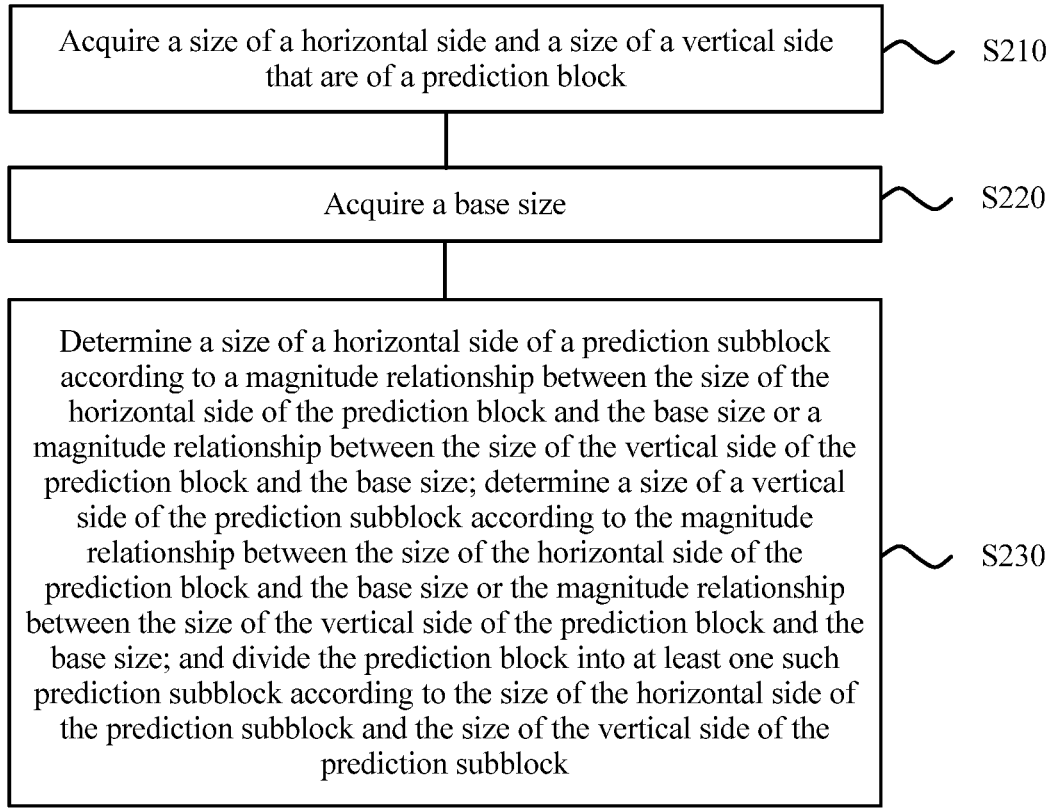
FIG. 9 is a schematic flowchart of a method for dividing a prediction block according to an embodiment of the present application.

FIG. 9 shows a schematic flowchart of a method 200 for dividing a prediction block according to an embodiment of the present application. The method 200 may be executed by an encoding device or a decoding device, and the method 200 includes S210. Acquire a size of a horizontal side and a size of a vertical side that are of the prediction block.

S220. Acquire a base size.

S230. Determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

Therefore, according to the method for dividing a prediction block in this embodiment of the present application, a magnitude relationship between a base size and either of a size of a horizontal side of the prediction block and a size of a vertical side of the prediction block is compared, when a size of a side of the prediction block is less than the base size or is not an integer multiple of the base size, the prediction block is divided into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Optionally, in an embodiment, the determining a size of a horizontal side of a prediction subblock according to a magnitude relationship between the size of the horizontal side of the prediction block and the base size or a magnitude relationship between the size of the vertical side of the prediction block and the base size, determining a size of a vertical side of the prediction subblock according to the magnitude relationship between the size of the horizontal side of the prediction block and the base size or the magnitude relationship between the size of the vertical side of the prediction block and the base size, and dividing the prediction block into at least one such prediction subblock according to the size of the horizontal side of the prediction subblock and the size of the vertical side of the prediction subblock includes when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, dividing the prediction block into one prediction subblock according to the size of the horizontal side of the prediction block and the size of the vertical side of the prediction block.

Further, for example, a size of a code block is 16×16. When the manner of division into the prediction block is 2N×nU or 2N×nD, 16×4 and 16×12 prediction blocks are obtained by means of division. The base size is set to M. If the base size M is 8, the 16×12 prediction block is divided according to the prior art to two 8×12 prediction subblocks. The 16×4 prediction block is divided to two 8×4 prediction subblocks. The 8×12 prediction subblocks do not belong to a prediction subblock of a size used in an existing encoding/decoding device. To avoid such a situation, a size of the prediction subblock may be determined according to a size of the prediction block.

When the size of the horizontal side of the prediction block is less than M, or the size of the vertical side of the prediction block is less than M, the prediction block is not further divided, that is, the prediction block is divided into one prediction subblock according to the size of the horizontal side of the prediction block and the size of the vertical side of the prediction block, or the prediction block is directly determined as a prediction subblock. For the foregoing example, the 16×4 prediction block is divided into one 16×4 prediction subblock.

When the size of the horizontal side of the prediction block is greater than M but is not divisible by M, or the size of the vertical side of the prediction block is greater than M but is not divisible by M, the prediction block is not further divided, that is, the prediction block is divided into one prediction subblock according to the size of the horizontal side of the prediction block and the size of the vertical side of the prediction block, or the prediction block is directly determined as a prediction subblock. For the foregoing example, the 16×12 prediction block is divided into one 16×12 prediction subblock.

Therefore, according to the method for dividing a prediction block in this embodiment of the present application, a magnitude relationship between a base size and either of a size of a horizontal side of the prediction block and a size of a vertical side of the prediction block is compared, when a size of a side of the prediction block is less than the base size or is not an integer multiple of the base size, the prediction block is divided into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Optionally, in an embodiment, the determining a size of a horizontal side of a prediction subblock according to a magnitude relationship between the size of the horizontal side of the prediction block and the base size or a magnitude relationship between the size of the vertical side of the prediction block and the base size, and determining a size of a vertical side of the prediction subblock according to the magnitude relationship between the size of the horizontal side of the prediction block and the base size or the magnitude relationship between the size of the vertical side of the prediction block and the base size includes when a preset condition is met, setting the size of the horizontal side of the prediction subblock to the size of the horizontal side of the prediction block and setting the size of the vertical side of the prediction subblock to the size of the vertical side of the prediction block, or when the preset condition is not met, setting the size of the horizontal side of the prediction subblock to the base size and setting the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

It should be understood that the ratio herein refers to a rounded-down division operation, that is, the ratio of the size of the horizontal side of the prediction block to the base size refers to a rounded-down result of dividing the size of the horizontal side of the prediction block by the base size, and the ratio of the size of the vertical side of the prediction block to the base size refers to a rounded-down result of dividing the size of the vertical side of the prediction block by the base size.

Further, if the base size is M, when a rounded-down result of dividing a size of a side of the prediction block by M is less than or equal to 1, it indicates that the size of the side of the prediction block is less than or equal to the base size, or the size of the side of the prediction block is not divisible by the base size. For example, when the size of the prediction block is 16×4, and the base size is 8, a rounded-down result of dividing the size of the vertical side of the prediction block by 8 is 0. When the size of the prediction block is 16×12, and the base size is 8, although the size of the vertical side of the prediction block is greater than the base size, the size of the vertical side of the prediction block is not divisible by the base size, and in this case, a rounded-down result of dividing the size of the vertical side by 8 is 1. Therefore, when a rounded-down result of dividing the size of the horizontal side of the prediction block by M is less than or equal to 1, or a rounded-down result of dividing the size of the vertical side of the prediction block by M is less than or equal to 1, the prediction block is not further divided, that is, the prediction block is divided into one prediction subblock according to the size of the horizontal side of the prediction block and the size of the vertical side of the prediction block, or the prediction block is directly determined as a prediction subblock. A specific implementation manner is as follows It is assumed that the base size is subPUSize, the size of the horizontal side of the prediction block is nPbW, and the size of the vertical side of the prediction block is nPbH. When a rounded-down result of dividing nPbW by subPUSize is less than or equal to 1 or a rounded-down result of dividing nPbH by subPUSize is less than or equal to 1, the size nSbW of the horizontal side of the prediction subblock is equal to the size nPbW of the horizontal side of the prediction block, when a rounded-down result of dividing nPbW by subPUSize is greater than 1 or a rounded-down result of dividing nPbH by subPUSize is greater than 1, the size of the horizontal side of the prediction subblock is equal to the base size subPUSize. When a rounded-down result of dividing nPbH by subPUSize is less than or equal to 1 or a rounded-down result of dividing nPbW by subPUSize is less than or equal to 1, the size nSbH of the vertical side of the prediction subblock is equal to the size nPbW of the vertical side of the prediction block, when a rounded-down result of dividing nPbH by subPUSize is greater than 1 or a rounded-down result of dividing nPbW by subPUSize is greater than 1, the size of the vertical side of the prediction subblock is equal to the base size subPUSize. A mathematical formula is expressed as follows:

$$nSbW=(nPbW/\text{sub}PUSize<=1\|nPbH/\text{sub}PUSize<=1)?nPbW:\text{sub}PUSize,$$

$$nSbH=(nPbW/\text{sub}PUSize<=1\|nPbH/\text{sub}PUSize<=1)?nPbH:\text{sub}PUSize,$$

where "/" is a divisibility symbol, "?" and " " are an expression of a selection in a computer language.

Optionally, in an embodiment, the method 200 may further include acquiring motion information according to the prediction subblock. In specific implementation, the motion information may be acquired from a reference view image or a texture image according to the prediction subblock. The texture of the prediction subblock obtained according to the method in this embodiment of the present application is consistent with the texture of the prediction block. Therefore, accuracy of a reference motion vector, in the motion information, acquired according to the prediction subblock is good.

Therefore, according to the method for dividing a prediction block in this embodiment of the present application, a magnitude relationship between a base size and either of a size of a horizontal side of the prediction block and a size of a vertical side of the prediction block is compared, when a size of a side of the prediction block is less than the base size or is not an integer multiple of the base size, the prediction block is divided into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

The foregoing describes in detail the method for dividing a prediction block according to the embodiments of the present application with reference to FIG. 1 to FIG. 9, and the following describes in detail a device according to the embodiments of the present application with reference to FIG. 10 to FIG. 17.

Figure 10:
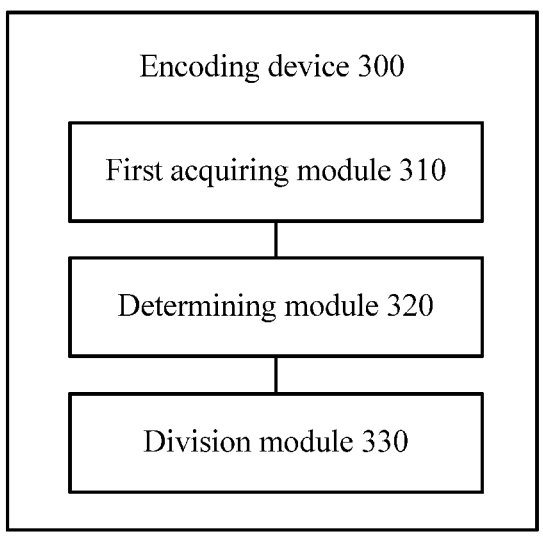
FIG. 10 is a schematic block diagram of an encoding device according to an embodiment of the present application.

FIG. 10 shows a schematic block diagram of an encoding device 300 according to an embodiment of the present application. As shown in FIG. 10, the encoding device 300 includes a first acquiring module 310 configured to acquire a manner of division into a prediction block, where the manner of division into the prediction block is a horizontal division manner, a vertical division manner, or a square division manner, a determining module 320 configured to determine a horizontal division size and a vertical division size according to the manner of division into the prediction block that is acquired by the first acquiring module 310, and a division module 330 configured to divide the prediction block into at least one prediction subblock according to the horizontal division size and the vertical division size that are determined by the determining module 320.

Therefore, the encoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Optionally, in an embodiment, a size of a horizontal side of the prediction subblock is equal to the horizontal division size, and a size of a vertical side of the prediction subblock is equal to the vertical division size.

Optionally, in an embodiment, the determining module 320 includes an acquiring submodule configured to acquire a base size M, where M is a positive integer, and a determining submodule configured to determine the horizontal division size and the vertical division size according to the manner of division into the prediction block and based on the base size M, where the manner of division into the prediction block is acquired by the first acquiring module 310, and the base size M is acquired by the acquiring submodule.

Optionally, in an embodiment, the determining module 320 is further configured to determine the horizontal division size and the vertical division size when the manner of division into the prediction block that is acquired by the first acquiring module 310 is a horizontal division manner, where the horizontal division size is greater than the vertical division size.

Optionally, in an embodiment, the determining submodule is further configured to when the manner of division into the prediction block that is acquired by the first acquiring module 310 is a horizontal division manner, determine the horizontal division size as J and determine the vertical division size as K, where J and K are positive integers, J is greater than M, and K is less than M.

Optionally, in an embodiment, a value of J is a corresponding value obtained by shifting M leftward by p places, and a value of K is a corresponding value obtained by shifting M rightward by p places, where p is a positive integer.

Optionally, in an embodiment, p=1.

Optionally, in an embodiment, the determining module 320 is further configured to determine the horizontal division size and the vertical division size when the manner of division into the prediction block that is acquired by the first acquiring module 310 is a vertical division manner, where the horizontal division size is less than the vertical division size.

Optionally, in an embodiment, the determining submodule is further configured to when the manner of division into the prediction block that is acquired by the first acquiring module 310 is a vertical division manner, determine the horizontal division size as Y and determine the vertical division size as Z, where Y and Z are positive integers, Y is less than M, and Z is greater than M.

Optionally, in an embodiment, a value of Y is a corresponding value obtained by shifting M rightward by q places, and a value of Z is a corresponding value obtained by shifting M leftward by q places, where q is a positive integer.

Optionally, in an embodiment, q=1.

Optionally, in an embodiment, the determining module 320 is further configured to determine the horizontal division size and the vertical division size when the manner of division into the prediction block that is acquired by the first acquiring module 310 is a square division manner, where the horizontal division size is equal to the vertical division size.

Optionally, in an embodiment, the determining submodule is further configured to when the manner of division into the prediction block that is acquired by the first acquiring module 310 is a square division manner, determine the horizontal division size as M and determine the vertical division size as M.

Optionally, in an embodiment, the division module 330 is further configured to when the horizontal division size is greater than a size of a horizontal side of the prediction block, divide the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, divide the prediction block into the prediction subblock according to the horizontal division size, where a size of a horizontal side of the prediction subblock is equal to the horizontal division size, or when the vertical division size is greater than a size of a vertical side of the prediction block, divide the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, divide the prediction block into the prediction subblock according to the vertical division size, where a size of a vertical side of the prediction subblock is equal to the vertical division size.

Optionally, in an embodiment, according to the horizontal division size and the vertical division size, sizes of horizontal sides of all obtained prediction subblocks are the same, and sizes of vertical sides of all obtained prediction subblocks are the same.

Optionally, in an embodiment, the encoding device 300 further includes a second acquiring module configured to acquire motion information according to the prediction subblock obtained by the division module.

Optionally, in an embodiment, the second acquiring module is further configured to acquire the motion information from a reference view image or a texture image according to the prediction subblock obtained by the division module.

Therefore, the encoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Figure 11:
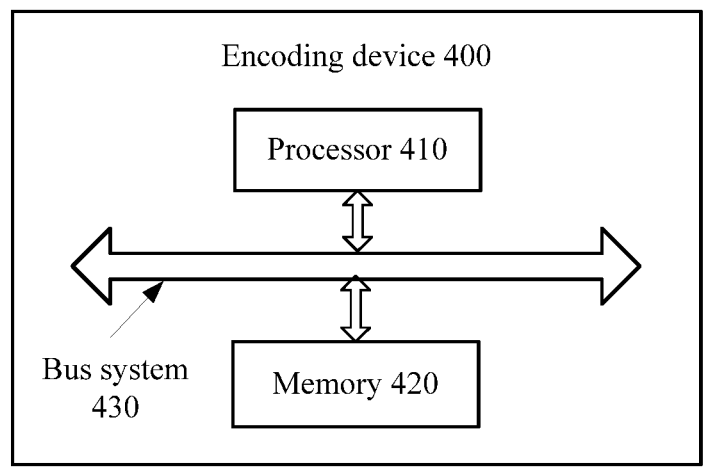
FIG. 11 is a schematic block diagram of an encoding device according to an embodiment of the present application.

As shown in FIG. 11, an embodiment of the present application further provides an encoding device 400, and the encoding device 400 includes a processor 410, a memory 420, and a bus system 430, where the processor 410 and the memory 420 are connected using the bus system 430. The memory 420 is configured to store an instruction, and the processor 410 is configured to execute the instruction stored in the memory 420. The processor 410 is configured to acquire a manner of division into a prediction block, where the manner of division into the prediction block is a horizontal division manner, a vertical division manner, or a square division manner, determine a horizontal division size and a vertical division size according to the manner of division into the prediction block, and divide the prediction block into at least one prediction subblock according to the horizontal division size and the vertical division size.

Therefore, the encoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

It should be understood that in this embodiment of the present application, the processor 410 may be a central processing unit (CPU), or the processor 410 may be another general-purpose processor, a digital signal processor (DSP), an application specific integrated circuit (ASIC), a field-programmable gate array (FPGA) or another programmable logic device, a discrete gate or transistor logic device, a discrete hardware assembly, or the like. The general-purpose processor may be a microprocessor or the processor may be any conventional processor, or the like.

The memory 420 may include a read-only memory and a random access memory, and provides an instruction and data for the processor 410. A part of the memory 420 may further include a non-volatile random access memory. For example, the memory 420 may further store information about a device type.

In addition to a data bus, the bus system 430 may further include a power bus, a control bus, a status signal bus, and the like. However, for clarity of description, various buses are marked as the bus system 430 in the figure.

In an implementation process, the steps in the foregoing methods may be completed by means of an integrated logic circuit of hardware in the processor 410 or an instruction in a form of software. Steps of the methods disclosed with reference to the embodiments of the present application may be directly executed and completed by a hardware processor, or may be executed and completed using a combination of hardware and software modules in the processor. The software modules may be located in a mature storage medium in the field, such as a random access memory, a flash memory, a read-only memory, a programmable read-only memory, an electrically-erasable programmable memory, or a register. The storage medium is located in the memory 420. The processor 410 reads information from the memory 420, and completes the steps of the foregoing methods in combination with the hardware of the processor 410. To avoid repetition, details are not described herein.

Optionally, in an embodiment, a size of a horizontal side of the prediction subblock is equal to the horizontal division size, and a size of a vertical side of the prediction subblock is equal to the vertical division size.

Optionally, in an embodiment, that the processor 410 is configured to acquire a base size M, where M is a positive integer, and determine the horizontal division size and the vertical division size according to the manner of division into the prediction block and based on the base size M.

Optionally, in an embodiment, that the processor 410 is configured to determine the horizontal division size and the vertical division size when the manner of division into the prediction block is a horizontal division manner, where the horizontal division size is greater than the vertical division size.

Optionally, in an embodiment, that the processor 410 is configured to when the manner of division into the prediction block is a horizontal division manner, based on the base size M, determine the horizontal division size as J and determining the vertical division size as K, where J and K are positive integers, J is greater than M, and K is less than M.

Optionally, in an embodiment, a value of J is a corresponding value obtained by shifting M leftward by p places, and a value of K is a corresponding value obtained by shifting M rightward by p places, where p is a positive integer.

Optionally, in an embodiment, p=1.

Optionally, in an embodiment, that the processor 410 is configured to determine the horizontal division size and the vertical division size when the manner of division into the prediction block is a vertical division manner, where the horizontal division size is less than the vertical division size.

Optionally, in an embodiment, that the processor 410 is configured to when the manner of division into the prediction block is a vertical division manner, based on the base size M, determine the horizontal division size as Y and determining the vertical division size as Z, where Y and Z are positive integers, Y is less than M, and Z is greater than M.

Optionally, in an embodiment, a value of Y is a corresponding value obtained by shifting M rightward by q places, and a value of Z is a corresponding value obtained by shifting M leftward by q places, where q is a positive integer.

Optionally, in an embodiment, q=1.

Optionally, in an embodiment, that the processor 410 is configured to determine the horizontal division size and the vertical division size when the manner of division into the prediction block is a square division manner, where the horizontal division size is equal to the vertical division size.

Optionally, in an embodiment, that the processor 410 is configured to when the manner of division into the prediction block is a square division manner, based on the base size M, determine the horizontal division size as M and determining the vertical division size as M.

Optionally, in an embodiment, that the processor 410 is configured to when the horizontal division size is greater than a size of a horizontal side of the prediction block, divide the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, divide the prediction block into the prediction subblock according to the horizontal division size, where a size of a horizontal side of the prediction subblock is equal to the horizontal division size, or when the vertical division size is greater than a size of a vertical side of the prediction block, divide the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, divide the prediction block into the prediction subblock according to the vertical division size, where a size of a vertical side of the prediction subblock is equal to the vertical division size.

Optionally, in an embodiment, according to the horizontal division size and the vertical division size, sizes of horizontal sides of all obtained prediction subblocks are the same, and sizes of vertical sides of all obtained prediction subblocks are the same.

Optionally, in an embodiment, the processor 410 is further configured to acquire motion information according to the prediction subblock.

Optionally, in an embodiment, that the processor 410 is configured to acquire the motion information from a reference view image or a texture image according to the prediction subblock.

It should be understood that the encoding device 400 according to this embodiment of the present application may be corresponding to an entity for executing the method in the embodiments of the present application, and may also be corresponding to the encoding device 300 in the embodiments of the present application, and the foregoing and other operations and/or functions of the modules of the encoding device 400 are used to implement corresponding procedures of the methods in FIG. 1 to FIG. 9, and are not further described herein for brevity.

Therefore, the encoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Figure 12:
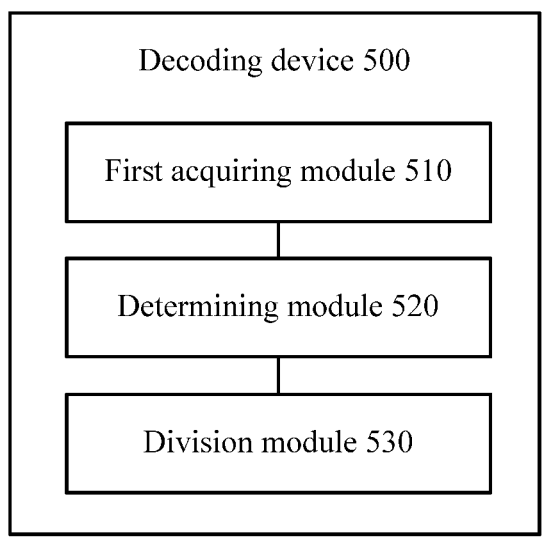
FIG. 12 is a schematic block diagram of a decoding device according to an embodiment of the present application.

FIG. 12 shows a schematic block diagram of a decoding device 500 according to an embodiment of the present application. As shown in FIG. 12, the decoding device 500 includes a first acquiring module 510 configured to acquire a manner of division into a prediction block, where the manner of division into the prediction block is a horizontal division manner, a vertical division manner, or a square division manner, a determining module 520 configured to determine a horizontal division size and a vertical division size according to the manner of division into the prediction block that is acquired by the first acquiring module 510, and a division module 530 configured to divide the prediction block into at least one prediction subblock according to the horizontal division size and the vertical division size that are determined by the determining module 520.

Therefore, the decoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Optionally, in an embodiment, a size of a horizontal side of the prediction subblock is equal to the horizontal division size, and a size of a vertical side of the prediction subblock is equal to the vertical division size.

Optionally, in an embodiment, the determining module 520 includes an acquiring submodule configured to acquire a base size M, where M is a positive integer, and a determining submodule configured to determine the horizontal division size and the vertical division size according to the manner of division into the prediction block and based on the base size M, where the manner of division into the prediction block is acquired by the first acquiring module 510, and the base size M is acquired by the acquiring submodule.

Optionally, in an embodiment, the determining module 520 is further configured to determine the horizontal division size and the vertical division size when the manner of division into the prediction block that is acquired by the first acquiring module 510 is a horizontal division manner, where the horizontal division size is greater than the vertical division size.

Optionally, in an embodiment, the determining submodule is further configured to when the manner of division into the prediction block that is acquired by the first acquiring module 510 is a horizontal division manner, determine the horizontal division size as J and determine the vertical division size as K, where J and K are positive integers, J is greater than M, and K is less than M.

Optionally, in an embodiment, a value of J is a corresponding value obtained by shifting M leftward by p places, and a value of K is a corresponding value obtained by shifting M rightward by p places, where p is a positive integer.

Optionally, in an embodiment, p=1.

Optionally, in an embodiment, the determining module 520 is further configured to determine the horizontal division size and the vertical division size when the manner of division into the prediction block that is acquired by the first acquiring module 510 is a vertical division manner, where the horizontal division size is less than the vertical division size.

Optionally, in an embodiment, the determining submodule is further configured to when the manner of division into the prediction block that is acquired by the first acquiring module 510 is a vertical division manner, determine the horizontal division size as Y and determine the vertical division size as Z, where Y and Z are positive integers, Y is less than M, and Z is greater than M.

Optionally, in an embodiment, a value of Y is a corresponding value obtained by shifting M rightward by q places, and a value of Z is a corresponding value obtained by shifting M leftward by q places, where q is a positive integer.

Optionally, in an embodiment, q=1.

Optionally, in an embodiment, the determining module 520 is further configured to determine the horizontal division size and the vertical division size when the manner of division into the prediction block that is acquired by the first acquiring module 510 is a square division manner, where the horizontal division size is equal to the vertical division size.

Optionally, in an embodiment, the determining submodule is further configured to when the manner of division into the prediction block that is acquired by the first acquiring module 510 is a square division manner, determine the horizontal division size as M and determine the vertical division size as M.

Optionally, in an embodiment, the division module 530 is further configured to when the horizontal division size is greater than a size of a horizontal side of the prediction block, divide the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, divide the prediction block into the prediction subblock according to the horizontal division size, where a size of a horizontal side of the prediction subblock is equal to the horizontal division size, or when the vertical division size is greater than a size of a vertical side of the prediction block, divide the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, divide the prediction block into the prediction subblock according to the vertical division size, where a size of a vertical side of the prediction subblock is equal to the vertical division size.

Optionally, in an embodiment, according to the horizontal division size and the vertical division size, sizes of horizontal sides of all obtained prediction subblocks are the same, and sizes of vertical sides of all obtained prediction subblocks are the same.

Optionally, in an embodiment, the decoding device 500 further includes a second acquiring module configured to acquire motion information according to the prediction subblock obtained by the division module.

Optionally, in an embodiment, the second acquiring module is further configured to acquire the motion information from a reference view image or a texture image according to the prediction subblock obtained by the division module.

Therefore, the decoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Figure 13:
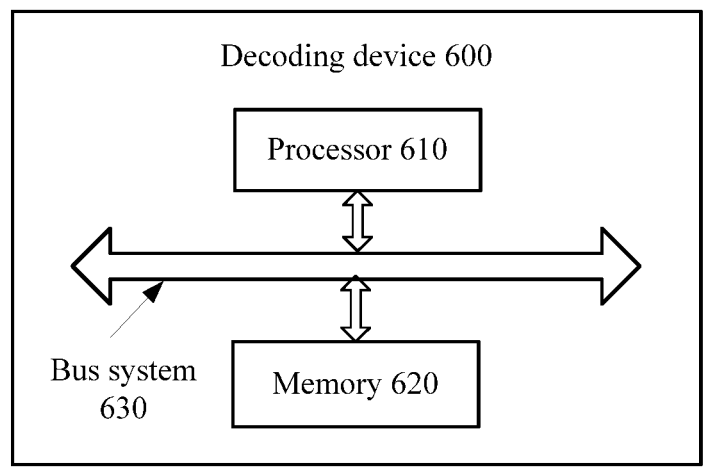
FIG. 13 is a schematic block diagram of a decoding device according to an embodiment of the present application.

As shown in FIG. 13, an embodiment of the present application further provides a decoding device 600, and the decoding device 600 includes a processor 610, a memory 620, and a bus system 630, where the processor 610 and the memory 620 are connected using the bus system 630. The memory 620 is configured to store an instruction, and the processor 610 is configured to execute the instruction stored in the memory 620. The processor 610 is configured to acquire a manner of division into a prediction block, where the manner of division into the prediction block is a horizontal division manner, a vertical division manner, or a square division manner, determine a horizontal division size and a vertical division size according to the manner of division into the prediction block, and divide the prediction block into at least one prediction subblock according to the horizontal division size and the vertical division size.

Therefore, the decoding device in this embodiment of the present application determines a horizontal division size and a vertical division size according to a manner of division into prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

It should be understood that in this embodiment of the present application, the processor 610 may be a central processing unit, or the processor 610 may be another general-purpose processor, a digital signal processor, an application specific integrated circuit, a field-programmable gate array or another programmable logic device, a discrete gate or transistor logic device, a discrete hardware assembly, or the like. The general-purpose processor may be a microprocessor or the processor may be any conventional processor, or the like.

The memory 620 may include a read-only memory and a random access memory, and provides an instruction and data for the processor 610. A part of the memory 620 may further include a non-volatile random access memory. For example, the memory 620 may further store information about a device type.

In addition to a data bus, the bus system 630 may further include a power bus, a control bus, a status signal bus, and the like. However, for clarity of description, various buses are marked as the bus system 630 in the figure.

In an implementation process, the steps in the foregoing methods may be completed by means of an integrated logic circuit of hardware in the processor 610 or an instruction in a form of software. Steps of the methods disclosed with reference to the embodiments of the present application may be directly executed and completed by a hardware processor, or may be executed and completed using a combination of hardware and software modules in the processor. The software modules may be located in a mature storage medium in the field, such as a random access memory, a flash memory, a read-only memory, a programmable read-only memory, an electrically-erasable programmable memory, or a register. The storage medium is located in the memory 620. The processor 610 reads information from the memory 620, and completes the steps of the foregoing methods in combination with the hardware of the processor 610. To avoid repetition, details are not described herein.

Optionally, in an embodiment, a size of a horizontal side of the prediction subblock is equal to the horizontal division size, and a size of a vertical side of the prediction subblock is equal to the vertical division size.

Optionally, in an embodiment, that the processor 610 is configured to acquire a base size M, where M is a positive integer, and determine the horizontal division size and the vertical division size according to the manner of division into the prediction block and based on the base size M.

Optionally, in an embodiment, that the processor 610 is configured to determine the horizontal division size and the vertical division size when the manner of division into the prediction block is a horizontal division manner, where the horizontal division size is greater than the vertical division size.

Optionally, in an embodiment, that the processor 610 is configured to when the manner of division into the prediction block is a horizontal division manner, based on the base size M, determine the horizontal division size as J and determining the vertical division size as K, where J and K are positive integers, J is greater than M, and K is less than M.

Optionally, in an embodiment, a value of J is a corresponding value obtained by shifting M leftward by p places, and a value of K is a corresponding value obtained by shifting M rightward by p places, where p is a positive integer.

Optionally, in an embodiment, p=1.

Optionally, in an embodiment, that the processor 610 is configured to determine the horizontal division size and the vertical division size when the manner of division into the prediction block is a vertical division manner, where the horizontal division size is less than the vertical division size.

Optionally, in an embodiment, that the processor 610 is configured to when the manner of division into the prediction block is a vertical division manner, based on the base size M, determine the horizontal division size as Y and determining the vertical division size as Z, where Y and Z are positive integers, Y is less than M, and Z is greater than M.

Optionally, in an embodiment, a value of Y is a corresponding value obtained by shifting M rightward by q places, and a value of Z is a corresponding value obtained by shifting M leftward by q places, where q is a positive integer.

Optionally, in an embodiment, q=1.

Optionally, in an embodiment, that the processor 610 is configured to determine the horizontal division size and the vertical division size when the manner of division into the prediction block is a square division manner, where the horizontal division size is equal to the vertical division size.

Optionally, in an embodiment, that the processor 610 is configured to when the manner of division into the prediction block is a square division manner, based on the base size M, determine the horizontal division size as M and determining the vertical division size as M.

Optionally, in an embodiment, that the processor 610 is configured to when the horizontal division size is greater than a size of a horizontal side of the prediction block, divide the prediction block into the prediction subblock according to the size of the horizontal side of the prediction block, where a size of a horizontal side of the prediction subblock is equal to the size of the horizontal side of the prediction block, or when the horizontal division size is less than or equal to a size of a horizontal side of the prediction block, divide the prediction block into the prediction subblock according to the horizontal division size, where a size of a horizontal side of the prediction subblock is equal to the horizontal division size, or when the vertical division size is greater than a size of a vertical side of the prediction block, divide the prediction block into the prediction subblock according to the size of the vertical side of the prediction block, where a size of a vertical side of the prediction subblock is equal to the size of the vertical side of the prediction block, or when the vertical division size is less than or equal to a size of a vertical side of the prediction block, divide the prediction block into the prediction subblock according to the vertical division size, where a size of a vertical side of the prediction subblock is equal to the vertical division size.

Optionally, in an embodiment, according to the horizontal division size and the vertical division size, sizes of horizontal sides of all obtained prediction subblocks are the same, and sizes of vertical sides of all obtained prediction subblocks are the same.

Optionally, in an embodiment, the processor 610 is further configured to acquire motion information according to the prediction subblock.

Optionally, in an embodiment, that the processor 610 is configured to acquire the motion information from a reference view image or a texture image according to the prediction subblock.

It should be understood that the decoding device 600 according to this embodiment of the present application may be corresponding to an entity for executing the method in the embodiments of the present application, and may also be corresponding to the decoding device 500 in the embodiments of the present application, and the foregoing and other operations and/or functions of the modules of the decoding device 600 are used to implement corresponding procedures of the methods in FIG. 1 to FIG. 9, and are not further described herein for brevity.

Therefore, the decoding device in this embodiment of the present application determines a horizontal division size and a vertical division size according to a manner of division into a prediction block, and divides the prediction block according to the horizontal division size and the vertical division size such that texture of a prediction subblock is consistent with texture of the prediction block, and occurrence of a prediction subblock whose size is not a size used in an existing encoding/decoding device can be avoided. Therefore, increase of implementation load on an encoding/decoding system is avoided, and accuracy of a reference motion vector acquired using the prediction subblock can be improved.

Figure 14:
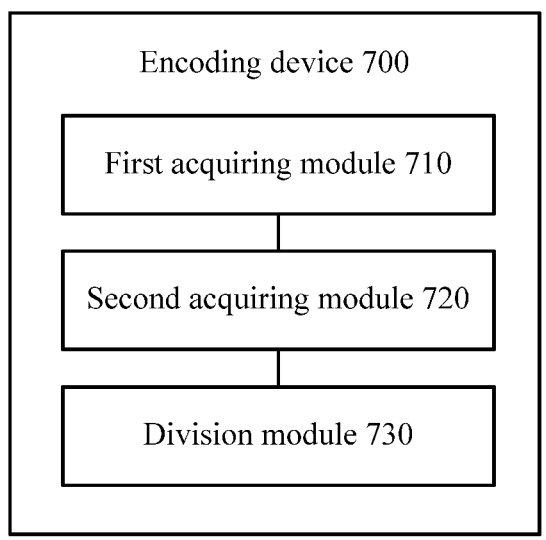
FIG. 14 is a schematic block diagram of an encoding device according to an embodiment of the present application.

FIG. 14 shows a schematic block diagram of an encoding device 700 according to an embodiment of the present application. As shown in FIG. 14, the encoding device 700 includes a first acquiring module 710 configured to acquire a size of a horizontal side and a size of a vertical side that are of a prediction block, a second acquiring module 720 configured to acquire a base size, and a division module 730 configured to determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

Therefore, the encoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Optionally, in an embodiment, the division module 730 is further configured to when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, divide the prediction block into one prediction subblock according to the size of the horizontal side of the prediction block and the size of the vertical side of the prediction block.

Optionally, in an embodiment, that the division module 730 determines a size of a horizontal side of a prediction subblock according to a magnitude relationship between the size of the horizontal side of the prediction block and the base size or a magnitude relationship between the size of the vertical side of the prediction block and the base size, and determines a size of a vertical side of the prediction subblock according to the magnitude relationship between the size of the horizontal side of the prediction block and the base size or the magnitude relationship between the size of the vertical side of the prediction block and the base size includes when a preset condition is met, setting the size of the horizontal side of the prediction subblock to the size of the horizontal side of the prediction block and setting the size of the vertical side of the prediction subblock to the size of the vertical side of the prediction block, or when the preset condition is not met, setting the size of the horizontal side of the prediction subblock to the base size and setting the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

Optionally, in an embodiment, the encoding device 700 further includes a third acquiring module configured to acquire motion information according to the prediction subblock obtained by the division module.

Optionally, in an embodiment, the third acquiring module is further configured to acquire the motion information from a reference view image or a texture image according to the prediction subblock obtained by the division module.

Therefore, the encoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Figure 15:
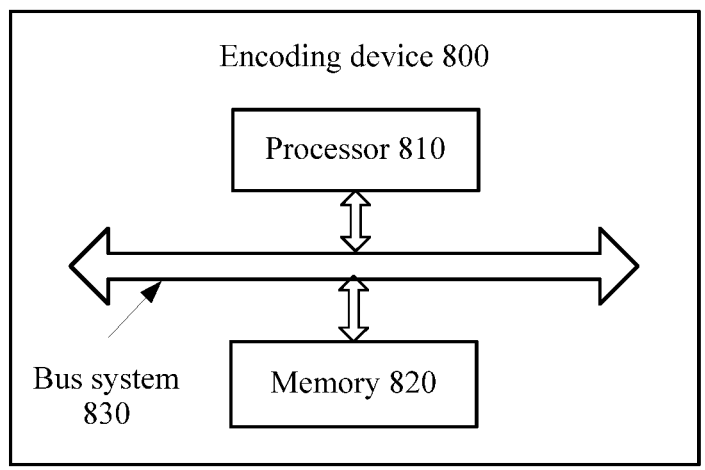
FIG. 15 is a schematic block diagram of an encoding device according to an embodiment of the present application.

As shown in FIG. 15, an embodiment of the present application further provides an encoding device 800, and the encoding device 800 includes a processor 810, a memory 820, and a bus system 830, where the processor 810 and the memory 820 are connected using the bus system 830. The memory 820 is configured to store an instruction, and the processor 810 is configured to execute the instruction stored in the memory 820. The processor 810 is configured to acquire a size of a horizontal side and a size of a vertical side that are of the prediction block, acquire a base size, and determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

Therefore, the encoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

It should be understood that in this embodiment of the present application, the processor 810 may be a central processing unit, or the processor 810 may be another general-purpose processor, a digital signal processor, an application specific integrated circuit, a field-programmable gate array or another programmable logic device, a discrete gate or transistor logic device, a discrete hardware assembly, or the like. The general-purpose processor may be a microprocessor or the processor may be any conventional processor, or the like.

The memory 820 may include a read-only memory and a random access memory, and provides an instruction and data for the processor 810. A part of the memory 820 may further include a non-volatile random access memory. For example, the memory 820 may further store information about a device type.

In addition to a data bus, the bus system 830 may further include a power bus, a control bus, a status signal bus, and the like. However, for clarity of description, various buses are marked as the bus system 830 in the figure.

In an implementation process, the steps in the foregoing methods may be completed by means of an integrated logic circuit of hardware in the processor 810 or an instruction in a form of software. Steps of the methods disclosed with reference to the embodiments of the present application may be directly executed and completed by a hardware processor, or may be executed and completed using a combination of hardware and software modules in the processor. The software modules may be located in a mature storage medium in the field, such as a random access memory, a flash memory, a read-only memory, a programmable read-only memory, an electrically-erasable programmable memory, or a register. The storage medium is located in the memory 820. The processor 810 reads information from the memory 820, and completes the steps of the foregoing methods in combination with the hardware of the processor 810. To avoid repetition, details are not described herein.

Optionally, in an embodiment, the processor 810 is further configured to when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, divide the prediction block into one prediction subblock according to the size of the horizontal side of the prediction block and the size of the vertical side of the prediction block.

Optionally, in an embodiment, that the processor 810 is configured to when a preset condition is met, set the size of the horizontal side of the prediction subblock to the size of the horizontal side of the prediction block and set the size of the vertical side of the prediction subblock to the size of the vertical side of the prediction block, or when the preset condition is not met, set the size of the horizontal side of the prediction subblock to the base size and set the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

Optionally, in an embodiment, the processor 810 is further configured to acquire motion information according to the prediction subblock.

Optionally, in an embodiment, that the processor 810 is configured to acquire the motion information from a reference view image or a texture image according to the prediction subblock.

It should be understood that the encoding device 800 according to this embodiment of the present application may be corresponding to an entity for executing the method in the embodiments of the present application, and may also be corresponding to the encoding device 700 in the embodiments of the present application, and the foregoing and other operations and/or functions of the modules of the encoding device 800 are used to implement corresponding procedures of the methods in FIG. 1 to FIG. 9, and are not further described herein for brevity.

Therefore, the encoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Figure 16:
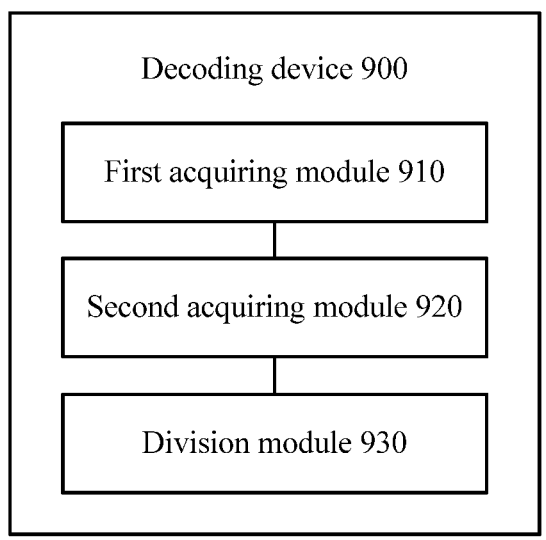
FIG. 16 is a schematic block diagram of a decoding device according to an embodiment of the present application.

FIG. 16 shows a schematic block diagram of a decoding device 900 according to an embodiment of the present application. As shown in FIG. 16, the decoding device 900 includes a first acquiring module 910 configured to acquire a size of a horizontal side and a size of a vertical side that are of a prediction block, a second acquiring module 920 configured to acquire a base size, and a division module 930 configured to determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

Therefore, the decoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Optionally, in an embodiment, the division module 930 is further configured to when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, divide the prediction block into one prediction subblock according to the size of the horizontal side of the prediction block and the size of the vertical side of the prediction block.

Optionally, in an embodiment, that the division module 930 determines a size of a horizontal side of a prediction subblock according to a magnitude relationship between the size of the horizontal side of the prediction block and the base size or a magnitude relationship between the size of the vertical side of the prediction block and the base size, and determines a size of a vertical side of the prediction subblock according to the magnitude relationship between the size of the horizontal side of the prediction block and the base size or the magnitude relationship between the size of the vertical side of the prediction block and the base size includes when a preset condition is met, setting the size of the horizontal side of the prediction subblock to the size of the horizontal side of the prediction block and setting the size of the vertical side of the prediction subblock to the size of the vertical side of the prediction block, or when the preset condition is not met, setting the size of the horizontal side of the prediction subblock to the base size and setting the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

Optionally, in an embodiment, the decoding device 900 further includes a third acquiring module configured to acquire motion information according to the prediction subblock obtained by the division module.

Optionally, in an embodiment, the third acquiring module is further configured to acquire the motion information from a reference view image or a texture image according to the prediction subblock obtained by the division module.

Therefore, the decoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Figure 17:
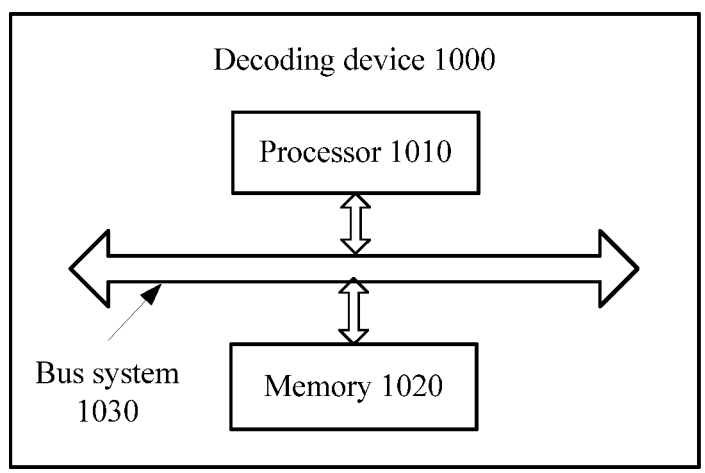
FIG. 17 is a schematic block diagram of a decoding device according to an embodiment of the present application.

As shown in FIG. 17, an embodiment of the present application further provides a decoding device 1000, and the decoding device 1000 includes a processor 1010, a memory 1020, and a bus system 1030, where the processor 1010 and the memory 1020 are connected using the bus system 1030. The memory 1020 is configured to store an instruction, and the processor 1010 is configured to execute the instruction stored in the memory 1020. The processor 1010 is configured to acquire a size of a horizontal side and a size of a vertical side that are of the prediction block, acquire a base size, and determine a size of a horizontal side of a prediction subblock according to a magnitude relationship between the size of the horizontal side of the prediction block and the base size or a magnitude relationship between the size of the vertical side of the prediction block and the base size, determine a size of a vertical side of the prediction subblock according to the magnitude relationship between the size of the horizontal side of the prediction block and the base size or the magnitude relationship between the size of the vertical side of the prediction block and the base size, and divide the prediction block into at least one such prediction subblock according to the size of the horizontal side of the prediction subblock and the size of the vertical side of the prediction subblock.

Therefore, the decoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

It should be understood that in this embodiment of the present application, the processor 1010 may be a central processing unit, or the processor 1010 may be another general-purpose processor, a digital signal processor, an application specific integrated circuit, a field-programmable gate array or another programmable logic device, a discrete gate or transistor logic device, a discrete hardware assembly, or the like. The general-purpose processor may be a microprocessor or the processor may be any conventional processor, or the like.

The memory 1020 may include a read-only memory and a random access memory, and provides an instruction and data for the processor 1010. A part of the memory 1020 may further include a non-volatile random access memory. For example, the memory 1020 may further store information about a device type.

In addition to a data bus, the bus system 1030 may further include a power bus, a control bus, a status signal bus, and the like. However, for clarity of description, various buses are marked as the bus system 1030 in the figure.

In an implementation process, the steps in the foregoing methods may be completed by means of an integrated logic circuit of hardware in the processor 1010 or an instruction in a form of software. Steps of the methods disclosed with reference to the embodiments of the present application may be directly executed and completed by a hardware processor, or may be executed and completed using a combination of hardware and software modules in the processor. The software modules may be located in a mature storage medium in the field, such as a random access memory, a flash memory, a read-only memory, a programmable read-only memory, an electrically-erasable programmable memory, or a register. The storage medium is located in the memory 1020. The processor 1010 reads information from the memory 1020, and completes the steps of the foregoing methods in combination with the hardware of the processor 1010. To avoid repetition, details are not described herein.

Optionally, in an embodiment, the processor 1010 is further configured to when the size of the horizontal side of the prediction block is less than the base size, or the size of the vertical side of the prediction block is less than the base size, or the size of the horizontal side of the prediction block is greater than the base size but is not divisible by the base size, or the size of the vertical side of the prediction block is greater than the base size but is not divisible by the base size, divide the prediction block into one prediction subblock according to the size of the horizontal side of the prediction block and the size of the vertical side of the prediction block.

Optionally, in an embodiment, that the processor 1010 is configured to when a preset condition is met, set the size of the horizontal side of the prediction subblock to the size of the horizontal side of the prediction block and set the size of the vertical side of the prediction subblock to the size of the vertical side of the prediction block, or when the preset condition is not met, set the size of the horizontal side of the prediction subblock to the base size and set the size of the vertical side of the prediction subblock to the base size, where the preset condition is that a ratio of the size of the horizontal side of the prediction block to the base size is less than or equal to 1, or a ratio of the size of the vertical side of the prediction block to the base size is less than or equal to 1.

Optionally, in an embodiment, the processor 1010 is further configured to acquire motion information according to the prediction subblock.

Optionally, in an embodiment, that the processor 1010 is configured to acquire the motion information from a reference view image or a texture image according to the prediction subblock.

It should be understood that the decoding device 1000 according to this embodiment of the present application may be corresponding to an entity for executing the method in the embodiments of the present application, and may also be corresponding to the decoding device 900 in the embodiments of the present application, and the foregoing and other operations and/or functions of the modules of the decoding device 1000 are used to implement corresponding procedures of the methods in FIG. 1 to FIG. 9, and are not further described herein for brevity.

Therefore, the decoding device in this embodiment of the present application compares a magnitude relationship between a base size and either of a size of a horizontal side of a prediction block and a size of a vertical side of the prediction block, when a size of a side of the prediction block is less than the base size or is not an integer multiple of the base size, divides the prediction block into one prediction subblock according to the size of the horizontal side of the prediction block and the size of the vertical side of the prediction block, which can avoid occurrence of a prediction subblock whose size is not a size used in an existing encoding/decoding device. Therefore, increase of implementation load on an encoding/decoding system is avoided, and accuracy of a reference motion vector acquired using the prediction subblock can be improved.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by persons skilled in the art within the technical scope disclosed in the present application shall fall within the protection scope of the present application. Therefore, the protection scope of the present application shall be subject to the protection scope of the claims.

What is claimed is:

1. An encoding device for dividing a prediction block of an image, the encoding device comprising:
　a memory comprising instructions; and
　a processor coupled to the memory and configured to execute the instructions, which cause the encoding device to:
　　acquire a size of a horizontal side and a size of a vertical side of the prediction block;
　　acquire a base size;
　　determine a size of a horizontal side of a prediction subblock according to a magnitude relationship between the size of the horizontal side of the prediction block and the base size or a magnitude relationship between the size of the vertical side of the prediction block and the base size;
　　determine a size of a vertical side of the prediction subblock according to the magnitude relationship between the size of the horizontal side of the prediction block and the base size or the magnitude relationship between the size of the vertical side of the prediction block and the base size;
　　divide the prediction block into at least one such prediction subblock according to the size of the horizontal side of the prediction subblock and the size of the vertical side of the prediction subblock;
　　set the size of the horizontal side of the prediction subblock to the size of the horizontal side of the prediction block and set the size of the vertical side of the prediction subblock to the size of the vertical side of the prediction block when a preset condition is met; and
　　set the size of the horizontal side of the prediction subblock to the base size and set the size of the vertical side of the prediction subblock to the base size when the preset condition is not met, wherein the preset condition comprises a ratio of the size of the horizontal side of the prediction block to the base size is less than or equal to one or a ratio of the size of the vertical side of the prediction block to the base size is less than or equal to one.

2. The encoding device of claim 1, wherein the instructions further cause the encoding device to divide the prediction block into one prediction subblock according to the size of the horizontal side of the prediction block and the size of the vertical side of the prediction block when one of the following conditions is true:
　the size of the horizontal side of the prediction block is less than the base size;
　the size of the vertical side of the prediction block is less than the base size;
　the size of the horizontal side of the prediction block is greater than the base size but is not divisible by the base size; or
　the size of the vertical side of the prediction block is greater than the base size but is not divisible by the base size.

3. The encoding device of claim 1, wherein the instructions further cause the encoding device to obtain motion information according to the prediction subblock.

4. The encoding device of claim 1, wherein the instructions further cause the encoding device to obtain the motion information from a reference view image or a texture image according to the prediction subblock.

5. A coding apparatus, comprising:
　a processor; and
　a non-transitory computer-readable storage medium coupled to the processor and storing programming instructions for execution by the processor, wherein the programming instructions instruct the processor to:
　　acquire a size of a horizontal side and a size of a vertical side of the prediction block;
　　acquire a base size;
　　determine a size of a horizontal side of a prediction subblock according to a magnitude relationship between the size of the horizontal side of the prediction block and the base size or a magnitude relationship between the size of the vertical side of the prediction block and the base size;

determine a size of a vertical side of the prediction subblock according to the magnitude relationship between the size of the horizontal side of the prediction block and the base size or the magnitude relationship between the size of the vertical side of the prediction block and the base size;

divide the prediction block into at least one such prediction subblock according to the size of the horizontal side of the prediction subblock and the size of the vertical side of the prediction subblock;

set the size of the horizontal side of the prediction subblock to the size of the horizontal side of the prediction block and set the size of the vertical side of the prediction subblock to the size of the vertical side of the prediction block when a preset condition is met; and set the size of the horizontal side of the prediction subblock to the base size and set the size of the vertical side of the prediction subblock to the base size when the preset condition is not met, wherein the preset condition comprises a ratio of the size of the horizontal side of the prediction block to the base size is less than or equal to one or a ratio of the size of the vertical side of the prediction block to the base size is less than or equal to one.

6. The coding apparatus of claim 5, wherein the programming instructions further instruct the processor to divide the prediction block into one prediction subblock according to the size of the horizontal side of the prediction block and the size of the vertical side of the prediction block when one of the following conditions is true:

the size of the horizontal side of the prediction block is less than the base size;

the size of the vertical side of the prediction block is less than the base size;

the size of the horizontal side of the prediction block is greater than the base size but is not divisible by the base size; or the size of the vertical side of the prediction block is greater than the base size but is not divisible by the base size.

7. The coding apparatus of claim 5, wherein the programming instructions further instruct the processor to obtain motion information according to the prediction subblock.

8. The coding apparatus of claim 5, wherein the programming instructions further instruct the processor to obtain the motion information from a reference view image or a texture image according to the prediction subblock.

9. A computer program product, comprising computer executable instructions stored on a non-transitory computer-readable medium, which when executed by a processor, cause the processor to:

acquire a size of a horizontal side and a size of a vertical side of the prediction block;

acquire a base size;

determine a size of a horizontal side of a prediction subblock according to a magnitude relationship between the size of the horizontal side of the prediction block and the base size or a magnitude relationship between the size of the vertical side of the prediction block and the base size;

determine a size of a vertical side of the prediction subblock according to the magnitude relationship between the size of the horizontal side of the prediction block and the base size or the magnitude relationship between the size of the vertical side of the prediction block and the base size;

divide the prediction block into at least one such prediction subblock according to the size of the horizontal side of the prediction subblock and the size of the vertical side of the prediction subblock;

set the size of the horizontal side of the prediction subblock to the size of the horizontal side of the prediction block and set the size of the vertical side of the prediction subblock to the size of the vertical side of the prediction block when a preset condition is met; and set the size of the horizontal side of the prediction subblock to the base size and set the size of the vertical side of the prediction subblock to the base size when the preset condition is not met, wherein the preset condition comprises a ratio of the size of the horizontal side of the prediction block to the base size is less than or equal to one, or a ratio of the size of the vertical side of the prediction block to the base size is less than or equal to one.

10. The computer program product of claim 9, wherein the instructions further cause the processor to divide the prediction block into one prediction subblock according to the size of the horizontal side of the prediction block and the size of the vertical side of the prediction block when one of the following conditions is true:

the size of the horizontal side of the prediction block is less than the base size;

the size of the vertical side of the prediction block is less than the base size;

the size of the horizontal side of the prediction block is greater than the base size but is not divisible by the base size; or the size of the vertical side of the prediction block is greater than the base size but is not divisible by the base size.

11. The computer program product of claim 9, wherein the instructions further cause the processor to obtain motion information according to the prediction subblock.

12. The computer program product of claim 9, wherein the instructions further cause the processor to obtain the motion information from a reference view image.

13. The computer program product of claim 9, wherein the instructions further cause the processor to obtain the motion information from a texture image according to the prediction subblock.

14. The computer program product of claim 9, wherein the instructions further cause the processor to divide the prediction block into one prediction subblock according to the size of the horizontal side of the prediction block and the size of the vertical side of the prediction block when the size of the horizontal side of the prediction block is less than the base size.

15. The computer program product of claim 9, wherein the instructions further cause the processor to divide the prediction block into one prediction subblock according to the size of the horizontal side of the prediction block and the size of the vertical side of the prediction block when the size of the vertical side of the prediction block is less than the base size.

16. The computer program product of claim 9, wherein the instructions further cause the processor to divide the prediction block into one prediction subblock according to the size of the horizontal side of the prediction block and the size of the vertical side of the prediction block when the size of the horizontal side of the prediction block is greater than the base size but is not divisible by the base size.

17. The computer program product of claim 9, wherein the instructions further cause the processor to divide the prediction block into one prediction subblock according to the size of the horizontal side of the prediction block and the size of the vertical side of the prediction block when the size of the vertical side of the prediction block is greater than the base size but is not divisible by the base size.

\* \* \* \* \*